US007918728B2

(12) United States Patent
Nguyen et al.

(10) Patent No.: US 7,918,728 B2

(45) **Date of Patent: *Apr. 5, 2011**

(54) PERSONAL GAMING DEVICE AND METHOD OF PRESENTING A GAME

(75) Inventors: Binh T. Nguyen, Reno, NV (US); Craig A. Paulsen, Reno, NV (US)

(73) Assignee: IGT, Reno, NV (US)

(*) Notice: Subject to any disclaimer, the term of this patent is extended or adjusted under 35 U.S.C. 154(b) by 672 days.

This patent is subject to a terminal disclaimer.

(21) Appl. No.: 10/672,307

(22) Filed: Sep. 26, 2003

(65) Prior Publication Data

US 2004/0137987 A1 Jul. 15, 2004

Related U.S. Application Data

(63) Continuation-in-part of application No. 09/882,558, filed on Jun. 15, 2001, now Pat. No. 6,628,939.

(51) Int. Cl.

| | |
|---|---|
| ***A63F 13/02*** | (2006.01) |
| ***A63F 13/08*** | (2006.01) |
| ***A63F 13/10*** | (2006.01) |
| ***A63F 13/12*** | (2006.01) |

(52) U.S. Cl. ................ 463/29; 463/16; 463/22; 463/39; 463/40; 463/41; 463/42; 463/47

(58) Field of Classification Search .................... 463/22, 463/25, 29, 36, 37, 39–42, 16, 47

See application file for complete search history.

(56) References Cited

U.S. PATENT DOCUMENTS 4,335,809 A 6/1982 Wain
4,467,424 A 8/1984 Hedges et al.
4,614,342 A 9/1986 Takashima
4,624,462 A * 11/1986 Itkis .............................. 273/237
4,764,666 A 8/1988 Bergeron
4,837,422 A 6/1989 Dethloff et al.

(Continued)

FOREIGN PATENT DOCUMENTS

AT 184721 T 10/1999

(Continued)

OTHER PUBLICATIONS

State of Nevada wireless gaming regulations, http://gaming.nv.gov/documents/pdf/techpolicy_06may18.pdf, downloaded Sep. 6, 2006.*

(Continued)

*Primary Examiner* — Peter Vo

*Assistant Examiner* — Matthew D Hoel

(74) *Attorney, Agent, or Firm* — Weaver Austin Villeneuve & Sampson LLP

(57) ABSTRACT

A game is presented to a player via a personal gaming device of the invention. In one embodiment, the gaming device includes a display screen, a processing unit including a processor and a memory, and a wireless communication interface associated with the processing unit. Game code is stored at the gaming device. A player pre-purchases game play, and information enabling the game device to present the game is provided, such as via a smart card, to the gaming device for use by the game code. The information may comprise game outcome information. The outcomes of played games are verified against stored information regarding the purchased games. Activation information is transmitted to the gaming device to enable operation of the device.

36 Claims, 7 Drawing Sheets

U.S. PATENT DOCUMENTS

| | | | | | |
|---|---|---|---|---|---|
| 4,856,787 | A | * | 8/1989 | Itkis | 273/237 |
| 5,038,022 | A | * | 8/1991 | Lucero | 463/25 |
| 5,048,831 | A | | 9/1991 | Sides | |
| 5,054,787 | A | | 10/1991 | Richardson | |
| 5,069,453 | A | | 12/1991 | Koza et al. | |
| 5,112,050 | A | | 5/1992 | Koza et al. | |
| 5,129,652 | A | | 7/1992 | Wilkinson | |
| 5,178,389 | A | | 1/1993 | Bentley et al. | |
| 5,218,356 | A | | 6/1993 | Knapp | |
| 5,242,163 | A | | 9/1993 | Fulton | |
| 5,265,874 | A | | 11/1993 | Dickinson et al. | |
| 5,324,035 | A | | 6/1994 | Morris et al. | |
| 5,342,047 | A | | 8/1994 | Heidel et al. | |
| 5,382,784 | A | | 1/1995 | Eberhardt | |
| 5,393,057 | A | | 2/1995 | Marnell, II | |
| 5,557,086 | A | | 9/1996 | Schulze et al. | |
| 5,618,045 | A | | 4/1997 | Kagan et al. | |
| 5,630,586 | A | | 5/1997 | Lowden | |
| 5,643,086 | A | | 7/1997 | Alcorn et al. | |
| 5,678,886 | A | | 10/1997 | Infanti | |
| 5,709,603 | A | | 1/1998 | Kaye | |
| 5,738,583 | A | | 4/1998 | Comas et al. | |
| 5,741,183 | A | | 4/1998 | Acres et al. | |
| 5,761,647 | A | | 6/1998 | Boushy | |
| 5,762,552 | A | | 6/1998 | Vuong et al. | |
| 5,768,382 | A | | 6/1998 | Schneier et al. | |
| 5,770,533 | A | * | 6/1998 | Franchi | 463/42 |
| 5,779,545 | A | | 7/1998 | Berg et al. | |
| 5,779,546 | A | | 7/1998 | Meissner et al. | |
| 5,795,228 | A | | 8/1998 | Trumbull et al. | |
| 5,797,085 | A | | 8/1998 | Beuk et al. | |
| 5,810,664 | A | | 9/1998 | Clapper, Jr. | |
| 5,851,149 | A | | 12/1998 | Xidos et al. | |
| 5,871,398 | A | * | 2/1999 | Schneier et al. | 463/16 |
| 5,905,523 | A | | 5/1999 | Woodfield et al. | |
| 5,915,023 | A | * | 6/1999 | Bernstein | 705/75 |
| 5,951,397 | A | | 9/1999 | Dickinson | |
| 5,970,143 | A | * | 10/1999 | Schneier et al. | 713/181 |
| 5,999,808 | A | * | 12/1999 | LaDue | 455/412.2 |
| 6,001,016 | A | * | 12/1999 | Walker et al. | 463/42 |
| 6,012,832 | A | | 1/2000 | Saunders et al. | |
| 6,012,983 | A | | 1/2000 | Walker et al. | |
| 6,019,283 | A | | 2/2000 | Lucero | |
| 6,024,640 | A | * | 2/2000 | Walker et al. | 463/17 |
| 6,048,269 | A | | 4/2000 | Burns et al. | |
| 6,093,100 | A | | 7/2000 | Singer et al. | |
| 6,099,408 | A | | 8/2000 | Schneier et al. | |
| 6,104,815 | A | | 8/2000 | Alcorn et al. | |
| 6,105,008 | A | * | 8/2000 | Davis et al. | 705/41 |
| 6,106,396 | A | | 8/2000 | Alcorn et al. | |
| 6,110,041 | A | | 8/2000 | Walker et al. | |
| 6,113,495 | A | | 9/2000 | Walker et al. | |
| 6,117,013 | A | | 9/2000 | Eiba | |
| 6,135,887 | A | | 10/2000 | Pease et al. | |
| 6,149,522 | A | | 11/2000 | Alcorn et al. | |
| 6,178,510 | B1 | | 1/2001 | O'Connor et al. | |
| 6,234,896 | B1 | | 5/2001 | Walker et al. | |
| 6,264,559 | B1 | | 7/2001 | Lawrence et al. | |
| 6,264,561 | B1 | | 7/2001 | Saffari et al. | |
| 6,270,410 | B1 | | 8/2001 | DeMar et al. | |
| 6,280,326 | B1 | | 8/2001 | Saunders | |
| 6,285,868 | B1 | | 9/2001 | LaDue | |
| 6,308,887 | B1 | | 10/2001 | Korman et al. | |
| 6,319,122 | B1 | | 11/2001 | Packes et al. | |
| 6,340,331 | B1 | | 1/2002 | Saunders et al. | |
| 6,354,941 | B2 | * | 3/2002 | Miller et al. | 463/19 |
| 6,394,907 | B1 | | 5/2002 | Rowe | |
| 6,402,614 | B1 | * | 6/2002 | Schneier et al. | 463/17 |
| 6,409,602 | B1 | | 6/2002 | Wiltshire et al. | |
| 6,416,414 | B1 | * | 7/2002 | Stadelmann | 463/42 |
| 6,424,819 | B1 | | 7/2002 | Yan | |
| 6,488,585 | B1 | | 12/2002 | Wells et al. | |
| 6,508,709 | B1 | | 1/2003 | Karmarkar | |
| 6,527,638 | B1 | | 3/2003 | Walker et al. | |
| 6,554,707 | B1 | | 4/2003 | Sinclair et al. | |
| 6,612,928 | B1 | | 9/2003 | Bradford et al. | |
| 6,628,939 | B2 | | 9/2003 | Paulsen | |
| 6,638,170 | B1 | | 10/2003 | Crumby | |
| 6,645,077 | B2 | | 11/2003 | Rowe | |
| 6,676,522 | B2 | | 1/2004 | Rowe et al. | |
| 6,682,421 | B1 | | 1/2004 | Rowe et al. | |
| 6,685,567 | B2 | | 2/2004 | Cockerille et al. | |
| 6,761,636 | B2 | | 7/2004 | Chung et al. | |
| 6,790,141 | B2 | | 9/2004 | Muir | |
| 6,800,029 | B2 | | 10/2004 | Rowe et al. | |
| 6,804,763 | B1 | | 10/2004 | Stockdale et al. | |
| 6,837,789 | B2 | | 1/2005 | Garahi et al. | |
| 6,843,725 | B2 | | 1/2005 | Nelson | |
| 6,846,238 | B2 | | 1/2005 | Wells | |
| 6,863,608 | B1 | | 3/2005 | LeMay et al. | |
| 6,918,831 | B2 | | 7/2005 | Nguyen et al. | |
| 6,942,570 | B2 | | 9/2005 | Schneier et al. | |
| 6,964,611 | B2 | * | 11/2005 | Packes et al. | 463/40 |
| 6,971,956 | B2 | | 12/2005 | Rowe et al. | |
| 6,988,946 | B2 | | 1/2006 | Michaelson et al. | |
| 7,008,317 | B2 | | 3/2006 | Cote et al. | |
| 7,037,193 | B1 | * | 5/2006 | Kasparov et al. | 463/17 |
| 7,111,141 | B2 | | 9/2006 | Nelson | |
| 7,116,782 | B2 | | 10/2006 | Jackson et al. | |
| 7,384,339 | B2 | | 6/2008 | LeMay et al. | |
| 7,515,718 | B2 | | 4/2009 | Nguyen et al. | |
| 2001/0003100 | A1 | * | 6/2001 | Yacenda | 463/41 |
| 2001/0039204 | A1 | * | 11/2001 | Tanskanen | 463/17 |
| 2001/0041612 | A1 | * | 11/2001 | Garahi et al. | 463/29 |
| 2002/0035538 | A1 | * | 3/2002 | Moreau | 705/39 |
| 2002/0035605 | A1 | * | 3/2002 | McDowell et al. | 709/206 |
| 2002/0042729 | A1 | * | 4/2002 | Yajima et al. | 705/5 |
| 2002/0060243 | A1 | * | 5/2002 | Janiak et al. | 235/382 |
| 2002/0066041 | A1 | * | 5/2002 | Lemke | 713/202 |
| 2002/0068629 | A1 | | 6/2002 | Allen et al. | |
| 2002/0069166 | A1 | * | 6/2002 | Moreau et al. | 705/40 |
| 2002/0085515 | A1 | * | 7/2002 | Jaynes et al. | 370/329 |
| 2002/0089410 | A1 | * | 7/2002 | Janiak et al. | 340/5.53 |
| 2002/0094860 | A1 | * | 7/2002 | Itkis et al. | 463/19 |
| 2002/0098883 | A1 | * | 7/2002 | Packes et al. | 463/20 |
| 2002/0098888 | A1 | | 7/2002 | Rowe et al. | |
| 2002/0103008 | A1 | * | 8/2002 | Rahn et al. | 455/557 |
| 2002/0111213 | A1 | * | 8/2002 | McEntee et al. | 463/42 |
| 2002/0115487 | A1 | | 8/2002 | Wells | |
| 2002/0119800 | A1 | * | 8/2002 | Jaggers et al. | 455/550 |
| 2002/0193099 | A1 | | 12/2002 | Paulsen | |
| 2003/0031321 | A1 | | 2/2003 | Mages | |
| 2003/0040354 | A1 | * | 2/2003 | Itkis et al. | 463/19 |
| 2003/0045341 | A1 | * | 3/2003 | Itkis et al. | 463/19 |
| 2003/0064805 | A1 | | 4/2003 | Wells | |
| 2003/0104865 | A1 | * | 6/2003 | Itkis et al. | 463/39 |
| 2003/0130029 | A1 | | 7/2003 | Crumby | |
| 2003/0130039 | A1 | | 7/2003 | Nelson | |
| 2003/0159044 | A1 | * | 8/2003 | Doyle et al. | 713/176 |
| 2003/0171986 | A1 | * | 9/2003 | Itkis et al. | 705/14 |
| 2003/0232647 | A1 | | 12/2003 | Moser | |
| 2004/0002885 | A1 | | 1/2004 | Nguyen | |
| 2004/0038723 | A1 | * | 2/2004 | Schneier et al. | 463/17 |
| 2004/0048667 | A1 | | 3/2004 | Rowe | |
| 2004/0053674 | A1 | | 3/2004 | Nguyen et al. | |
| 2004/0053692 | A1 | | 3/2004 | Chatigny et al. | |
| 2004/0192439 | A1 | * | 9/2004 | Kula | 463/29 |
| 2004/0209690 | A1 | | 10/2004 | Bruzzese et al. | |
| 2004/0224741 | A1 | * | 11/2004 | Jen et al. | 463/6 |
| 2004/0235550 | A1 | | 11/2004 | McNally et al. | |
| 2004/0242321 | A1 | * | 12/2004 | Overton | 463/29 |
| 2005/0009600 | A1 | | 1/2005 | Rowe et al. | |
| 2005/0059485 | A1 | | 3/2005 | Paulsen et al. | |
| 2005/0101383 | A1 | | 5/2005 | Wells | |
| 2005/0107164 | A1 | | 5/2005 | Muir et al. | |
| 2005/0130728 | A1 | | 6/2005 | Nguyen et al. | |
| 2005/0143169 | A1 | | 6/2005 | Nguyen et al. | |
| 2005/0164783 | A1 | | 7/2005 | Paulsen et al. | |
| 2005/0181870 | A1 | | 8/2005 | Nguyen et al. | |
| 2005/0239530 | A1 | | 10/2005 | Walker et al. | |
| 2006/0009275 | A1 | * | 1/2006 | Packes et al. | 463/17 |
| 2006/0019745 | A1 | | 1/2006 | Benbrahim | |
| 2006/0035707 | A1 | | 2/2006 | Nguyen et al. | |
| 2006/0058102 | A1 | | 3/2006 | Nguyen et al. | |
| 2006/0068895 | A1 | | 3/2006 | Nguyen et al. | |
| 2006/0111168 | A1 | | 5/2006 | Nguyen et al. | |
| 2007/0207852 | A1 | | 9/2007 | Nelson et al. | |

| | | | |
|---|---|---|---|
| 2008/0026844 | A1 | 1/2008 | Wells |
| 2008/0076547 | A1 | 3/2008 | Bigelow et al. |
| 2008/0076572 | A1 | 3/2008 | Nguyen et al. |
| 2008/0182667 | A1 | 7/2008 | Davis et al. |
| 2008/0188308 | A1 | 8/2008 | Shepherd et al. |

FOREIGN PATENT DOCUMENTS

| | | | |
|---|---|---|---|
| AU | 4664296 | A | 8/1996 |
| AU | 199871427 | | 4/1998 |
| AU | 199954012 | | 4/2000 |
| AU | 2001249901 | | 10/2001 |
| AU | 2001255746 | | 11/2001 |
| BR | 9606847 | A | 11/1997 |
| CA | 2 211 297 | A1 | 8/1996 |
| CA | 2273458 | | 1/2000 |
| CA | 2 302 548 | A1 | 5/2000 |
| CA | 2 211 297 | C | 8/2002 |
| CN | 1174620 | A | 2/1998 |
| CN | 1098510 | C | 1/2003 |
| CZ | 9702296 | A3 | 12/1997 |
| CZ | 294 347 | B6 | 12/2004 |
| DE | 195 02 613 | A1 | 1/1996 |
| DE | 195 02 613 | | 8/1996 |
| DE | 199 22 862 | A1 | 12/2000 |
| EP | 0 024 184 | A2 | 2/1981 |
| EP | 0631247 | | 12/1994 |
| EP | 0 649 102 | A2 | 4/1995 |
| EP | 0 744 786 | A1 | 11/1996 |
| EP | 0 806 024 | A1 | 11/1997 |
| EP | 0 924 657 | A2 | 6/1999 |
| EP | 0 806 024 | B1 | 9/1999 |
| EP | 1 028 551 | A2 | 8/2000 |
| EP | 1 045 346 | A2 | 10/2000 |
| EP | 1 059 742 | A1 | 12/2000 |
| EP | 1 059 742 | A4 | 5/2001 |
| EP | 1 231 577 | | 8/2002 |
| FI | 973046 D | | 7/1997 |
| FI | 973046 | A | 9/1997 |
| GB | 2 151 054 | A | 7/1985 |
| GB | 2 161 008 | | 1/1986 |
| GB | 2161629 | | 1/1986 |
| GB | 2 284 913 | A | 6/1995 |
| HU | 9800695 (A2) | | 7/1998 |
| JP | 10512984 (T) | | 12/1998 |
| JP | 2002-530006 | T | 9/2002 |
| NO | 973355 | A | 9/1997 |
| NO | 316247B | B1 | 12/2003 |
| PL | 321544 (A1) | | 12/1997 |
| RU | 2132569 | C1 | 6/1999 |
| RU | 2144264 | C1 | 1/2000 |
| RU | 2145116 | | 1/2000 |
| RU | 2174258 | C2 | 9/2001 |
| SK | 101397 | A3 | 2/1998 |
| SK | 284750B | B6 | 11/2005 |
| WO | WO93/10508 | | 5/1993 |
| WO | WO95/24689 | | 9/1995 |
| WO | WO96/00950 | | 1/1996 |
| WO | WO96/23289 | A1 | 8/1996 |
| WO | WO98/58509 | | 12/1998 |
| WO | WO99/23594 | | 5/1999 |
| WO | WO99/34599 | | 7/1999 |
| WO | WO99/42964 | | 8/1999 |
| WO | WO99/51313 | | 10/1999 |
| WO | WO00/28680 | A1 | 5/2000 |
| WO | WO00/31982 | | 6/2000 |
| WO | WO-A-00/41428 | | 7/2000 |
| WO | WO-A-00/49731 | | 8/2000 |
| WO | WO00/67213 | | 11/2000 |
| WO | WO00/79467 | | 12/2000 |
| WO | WO01/00291 | A1 | 1/2001 |
| WO | WO01/01379 | A1 | 1/2001 |
| WO | WO01/003786 | | 1/2001 |
| WO | WO01/48712 | A1 | 7/2001 |
| WO | WO01/54091 | | 7/2001 |
| WO | WO01/74461 | | 10/2001 |
| WO | WO01/76710 | A2 | 10/2001 |
| WO | WO02/055163 | | 7/2002 |
| WO | WO02/101486 | | 12/2002 |
| WO | WO02/102483 | A1 | 12/2002 |
| WO | WO02/103550 | | 12/2002 |
| WO | WO03/005743 | | 1/2003 |
| WO | WO03/008057 | A1 | 1/2003 |
| WO | WO03/019486 | | 3/2003 |
| WO | WO03/027970 | | 4/2003 |
| WO | WO2005/031666 | A1 | 4/2005 |
| WO | WO2006/009791 | | 1/2006 |
| WO | WO2006/138064 | | 12/2006 |
| WO | WO2008/030928 | | 3/2008 |

OTHER PUBLICATIONS

Palm M100 specifications, downloaded from www.palm.com Sep. 6, 2006.*

Author Unknown, "Smart Cubicles," Business Week, Mar. 6, 2000.

Author Unknown, "Call My Agent," Business Week, Mar. 6, 2000.

Author Unknown, "The Tube," Business Week, Mar. 6, 2000.

PCT Written Opinion of the International Searching Authority, Jan. 19, 2005, Application No. PCT/US2004/031315.

PCT Application No. PCT/US2005/021350 International Search Report dated Sep. 19, 2005.

PCT Application No. PCT/US2005/021350 Written Opinion dated Sep. 19, 2005.

U.S. Appl. No. 10/937,989, filed Sep. 10, 2004.

U.S. Appl. No. 10/995,636, filed Nov. 22, 2004.

U.S. Appl. No. 10/897,822, filed Jul. 22, 2004.

U.S. Appl. No. 10/937,990, filed Sep. 10, 2004.

Advisory Office Action of related Russian Patent Application No. 2003136277/09(039251), May 26, 2006, 5 pages.

"Examination Report from Corresponding European Application No. 04788976.1-1238," Jul. 20, 2006, 3 pages.

Office Action from Corresponding Foreign Application No. 2,454,581, dated Jun. 4, 2007, 3 pages.

US Office Action dated Apr. 3, 2003 issued in U.S. Appl. No. 09/967,326.

US Office Action Final dated Oct. 20, 2003 issued in U.S. Appl. No. 09/967,326.

US Office Action (Advisory Action) dated Feb. 4, 2004 issued in U.S. Appl. No. 09/967,326.

US Office Action dated Feb. 25, 2004 issued in U.S. Appl. No. 09/967,326.

US Notice of Allowance dated Sep. 20, 2004 issued in U.S. Appl. No. 09/967,326.

US Office Action dated Nov. 2, 2006 issued in U.S. Appl. No. 11/014,150.

US Notice of Allowance dated Feb. 8, 2007 issued in U.S. Appl. No. 11/014,150.

US Office Action dated Aug. 6, 2007 issued in U.S. Appl. No. 11/014,150.

US Office Action Final dated Mar. 26, 2008 issued in U.S. Appl. No. 11/014,150.

US Office Action (Examiner Interview Summary) dated Aug. 28, 2008 issued in U.S. Appl. No. 11/014,150.

US Office Action Final dated Dec. 3, 2008 issued in U.S. Appl. No. 11/014,150.

US Office Action Final dated Jul. 30, 2009 issued in U.S. Appl. No. 11/014,150.

US Office Action Final dated Dec. 15, 2008 issued in U.S. Appl. No. 11/888,326.

US Office Action (Notice of Abandonment dated) Jun. 10, 2009 issued in U.S. Appl. No. 11/888,326.

US Office Action dated Jun. 27, 2008 issued in U.S. Appl. No. 10/871,876.

US Office Action Final dated Feb. 12, 2009 issued in U.S. Appl. No. 10/871,876.

US Office Action (Advisory Action) dated Apr. 27, 2009 issued in U.S. Appl. No. 10/871,876.

US Office Action dated Jul. 29, 2009 issued in U.S. Appl. No. 10/871,876.

US Office Action Final dated Jul. 31, 2002 issued in U.S. Appl. No. 09/882,558.

US Office Action Final dated Feb. 21, 2003 issued in U.S. Appl. No. 09/882,558.

US Notice of Allowance dated May 9, 2003 issued in U.S. Appl. No. 09/882,558.
PCT International Search Report dated Sep. 23, 2003 issued in PCT/US02/31061.
PCT International Written Opinion dated Nov. 10, 2003 issued in PCT/US02/31061.
PCT International Preliminary Examination Report dated Jan. 19, 2004 issued in PCT/US02/31061.
AU Examiner's Report No. 1 dated Aug. 30, 2007 issued in AU Application No. 2002348579.
AU Examiner's Report No. 2 dated Sep. 22, 2008 issued in AU Application No. 2002348579.
AU Examiner's Report No. 3 dated Dec. 18, 2008 issued in AU Application No. 2002348579.
AU Examiner's Report No. 4 dated Mar. 30, 2009 issued in AU Application No. 2002348579.
EP Examination Report dated Aug. 3, 2004 issued in EP Application No. 02 782 084.4.
EP Office Action dated Nov. 18, 2005 issued in EP Application No. 02 782 084.4 (9 pages).
EP Summons to Attend Oral Proceedings EP Office Action dated Nov. 24, 2006 issued in EP Application No. 02 782 084.4.
EP Result of Consultation Office Action dated Mar. 22, 2007 issued in EP Application No. 02 782 084.4.
EP Result of Consultation dated Jul. 5, 2007 issued in EP Application No. 02 782 084.4.
EP Extended Search Report dated Jun. 6, 2007 issued in EP Application No. 07 005 397.0.
EP Summons to Attend Oral Proceedings dated Apr. 14, 2008 issued in EP 07 005 397.0-2221.
EP Examination dated Nov. 7, 2007 issued in EP Application No. 07 005 397.0-2221.
EP Result of Consultation dated Jan. 28, 2009 issued in EP Application No. 07 005 397.0-2221.
EP Decision to Refuse a European patent application dated Mar. 3, 2009 issued in EP Application No. 07 005 397.0-2221.
EP Extended Search Report dated Jan. 30, 2008 issued in EP 07 015 979.3-2221.
EP Communication re Examination dated Jun. 6, 2008 issued in EP 07 015 979.3-2221.
EP Summons to Attend Oral Proceedings dated Apr. 30, 2009 issued in EP 07 015 979.3-2221.
RU Office Action dated Sep. 12, 2006 issued in RU Application No. 2004/109515/09 (010378).
RU Office Action dated Feb. 8, 2007 issued in RU Application No. 2004/109515/09.
PCT International Search Report dated Sep. 19, 2005 issued in PCT/US2005/021350.
PCT International Preliminary Report on Patentability and Written Opinion dated Sep. 18, 2005 issued in PCT/US2005/021350.
PCT International Preliminary Examination Report dated Sep. 11, 2003 issued in PCT/US2002/18861.
PCT International Search Report dated Oct. 29, 2002 issued in PCT/US02/18861.
PCT Written Opinion dated Apr. 8, 2003 issued in PCT/US02/18661.
AU Examiner's First Report dated Mar. 9, 2006 issued in AU Application No. 2002347362.
CA Office Action dated Sep. 5, 2008 issued in CA Application No. 2,454,581.
CA Office Action dated Sep. 3, 2009 issued in CA Application No. 2,454,581.
EP Supplementary Search Report dated Dec. 4, 2008 issued in EP 02 752 049.3-2221.
RU Advisory Office Action dated Sep. 19, 2006 issued in RU Application No. 2003136277/09 (039251).
RU Grant of Patent dated Apr. 9, 2007 issued in RU Application No. 2003136277/09 (039251).
PCT International Search Report dated Jan. 19, 2005 issued in PCT/US2004/031315.
CN Office Action dated May 16, 2008 issued in 2004800276444.
CN Office Action dated Apr. 24, 2009 issued in 2004800276444.
EP Summons to Attend Oral Proceedings dated Jan. 30, 2009 issued in EP 04 788 976.1.
PCT International Search Report dated Sep. 29, 2006 issued in PCT/US2006/021230 (WO 2006/138064).
PCT International Preliminary Examination Report and Written Opinion dated Sep. 29, 2006 issued in PCT/US2006/021230 (WO 2006/138064).
EP Examination Report dated May 4, 2009 issued in EP 06 760 619.4-1238.
Patent Abstracts of Japan vol. 2000, No. 22, Mar. 9, 2001 & JP 2001 146058 A (Sato Corp), May 29, 2001 abstract.
Anonymous: "EM5007YW Multimedia Cassiopeia-Yellow", Casio.com, [Online], Aug. 2, 2001, XP002430868, Retrieved from the Internet: URL:http://web.archive.org/web/20010802165446/www.casio.com/personalpcs/product.cfm?section=19&product=1972> [retrieved on Apr. 24, 2007].
Anonymous: "E-125 Cassiopeia", Casio.com, [Online] XP002430869, Retrieved from the Internet: URL:http://web.archive.org/web/20011004012420/www.casio.com/personalpcs/product.cfm?section=19&product=3553.
Gigaset CL4 SIMpad Siemens.com, description [Online] Jun. 25, 2001, XP002430870 Retrieved from Internet: URL:http://web.archive.org/web/20010625204821/www.mysiemens.com/MySiemens/CDA/Standard/Frameset/0.1649.3_SIMPADCL4_0___61_0,FF.html (3 pages).
http://de.wikipedia.org/wiki/SIMpad (1 page, in German).
Internet/Intranet Information Appliance: Brilliant 15 Screen in Compact, Space saving Design, DT Research, Inc., www.dtresearch.com Oct. 2000, 2 pages.
Laptop.pdf as copied from Wikipedia (http://en.wikipedia.org/wiki/Laptop), 22 pages, [Retrieved from the Internet on Nov. 23, 2008].
PCI Local Bus.pdf as redirected from Mini PCI from search on Wikipedia (http://en.wikipedia.org/wiki/MiniPCI), [Retrieved from Internet on Nov. 29, 2008] 15 pages.
The definition of graphical, *The American Heritage®* Dictionary of the English Language, *Third Edition*, copyright 1992 by Houghton Mifflin Company.
Wireless LAN.pdf as copied from Wikipedia (http://en.wikipedia.org/wiki/Wireless_LAN), [Retrieved from the Internet on Nov. 23, 2008] 12 pages.
Wireless network.pdf as copied from Wikipedia (http://en.wikipedia.org/wiki/wireless_network), [Retrieved from Internet on Sep. 24, 2009] 4 pages.
Wireless router.pdf as copied from Wikipedia (http://en.wikipedia.org/wiki/Wireless_router), [Retrieved from the Internet on Nov. 29, 2008] 3 pages.
US Notice of Allowance dated Feb. 2, 2010 issued in U.S. Appl. No. 11/014,150.
US Office Action (Miscellaneous Communication to Applicant-No Action Count) dated Mar. 23, 2010 issued in U.S. Appl. No. 11/014,150.
US Office Action Final dated Jan. 20, 2010 issued in U.S. Appl. No. 10/871,876.
US Office Action dated Oct. 9, 2009 issued in U.S. Appl. No. 11/155,702.
U.S. Office Action dated Aug. 22, 2002 issued in U.S. Appl. No. 09/882,559.
U.S. Office Action Final dated Jan. 27, 2003 issued in U.S. Appl. No. 09/882,559.
U.S. Notice of Allowance dated Jul. 16, 2003 issued in U.S. Appl. No. 09/882,559.
EP Commencement of Proceedings before the Board of Appeal dated Jul. 30, 2009 issued in EP Application No. 07 005 397.0-2221.
AU Examiner's First Report dated Sep. 7, 2009 issued in AU Application No. 2004277242.
CN Third Office Action dated Oct. 16, 2009 issued in 2004800276444.
EP Search Report dated Nov. 18, 2009 issued in EP 09 15 9225.3 (EP 2 083 402 A3).
CN First Office Action dated Oct. 16, 2009 issued in 200680021769.5.
PCT International Preliminary Examination Report dated Aug. 22, 2003 issued in PCT/US02/18875 (WO02/103550).
PCT International Search Report dated Sep. 12, 2002 issued in PCT/US02/18875 (WO02/103550).

PCT Written Opinion dated Feb. 24, 2003 issued in PCT/US02/18875 (WO02/103550).
AU Examiner's First Report dated Mar. 23, 2007 issued in AU 2002322096.
AU Examiner's Second Report dated Oct. 23, 2007 issued in AU 2002322096.
AU Notice of Opposition dated Apr. 6, 2009 issued in AU 2002322096.
AU Statement of Grounds and Particulars dated Jul. 3, 2009 issued in AU 2002322096.
AU Notice Opposition has been Withdrawn dated Aug. 19, 2009 issued in AU 2002322096.
European Supplementary Search Report dated Dec. 4, 2008 issued in EP 02 756 187.7-2221.
European Examination Report dated Mar. 20, 2009 issued in EP 02 756 187.7-2221.
RU Advisory Office Action dated May 31, 2006 issued in RU 2003136278/09 (039240).
RU Resolution on Granting dated Oct. 4, 2006 issued in RU 2003136278/09 (039240).
PCT International Search Report dated Mar. 13, 2008 issued in PCT/US2007/077714 (WO08/030928).
PCT International Preliminary Report on Patentability and Written Opinion dated Mar. 10, 2009 issued in PCT/US2007/077714 (WO08/030928).
EP Examination Report dated Jun. 24, 2009 issued in EP 07 841 947.0.
EP Examination Report dated Nov. 25, 2009 issued in EP 07 841 947.0.
Palermo, Vincent, "Near-filed magnetic comms emerges", Digital TV DesignLine.com.
International Search Report and Written Opinion from International Application No. PCT/US2006/021230, Sep. 29, 2006, 10 pages.

* cited by examiner

PERSONAL GAMING DEVICE AND METHOD OF PRESENTING A GAME

RELATED APPLICATION DATA

This application is a continuation-in-part of U.S. application Ser. No. 09/882,558, filed Jun. 15, 2001 now U.S. Pat. No. 6,628,939.

FIELD OF THE INVENTION

The present invention relates to gaming devices, and more particularly to a personal gaming device.

BACKGROUND OF THE INVENTION

Gaming is ever more popular, and casinos and other gaming establishments continually seek new and exciting ways to present games for play. Currently, games are generally presented on large free-standing gaming devices, such as the well known slot machine and video poker machines. Some games are presented at other than a gaming device, such as the table games of craps, blackjack and roulette. In addition, games such as keno and bingo may be played from tables in areas specially configured to present the game to players (such as in an area where personnel are arranged to pick up keno cards and called numbers are displayed on large displays).

A substantial disadvantage to the way such games are currently presented is that a player may participate in a game in only certain specified locations. For example, in order to play video poker, a player may be required to travel through a large hotel/casino to a specific gaming area where the video poker machine is located.

Gaming operators desire to provide to their customers greater accessibility to gaming devices and the opportunity to play games.

SUMMARY OF THE INVENTION

One aspect of the invention is a personal gaming device adapted to present a game to a player. In one embodiment, the personal gaming device is a part of a gaming system. The invention also comprises various methods of presenting a game to a player via the personal gaming device, reconciling game results, and verifying a personal gaming device for use.

In one embodiment, the personal gaming device includes a display screen, a processing unit including a processor and a memory, and a wireless communication interface associated with the processing unit. The wireless communication interface is adapted to receive data and provide it to the processing unit, and is also adapted to transmit data provided by the processing unit. In one or more embodiments, the received information comprises game data generated at a remote location which is used by the gaming device to present a game to the player.

In one or more embodiments, the personal gaming device is a hand-held device which has a body which houses the processing unit and other electronics. The personal gaming device may include a card reader for reading a magnetic stripe, smart card data or other encoded information, such as credit card information. The personal gaming device may also include a speaker for outputting game sound to a player.

In one embodiment, the personal gaming device is detachable from or operable independent of remote devices or networks. In other words, a network connection may or may not be present or be required when the personal gaming device is being operated.

In one embodiment, data may, instead of or in addition to being transmitted via the wireless communication interface, be transmitted and/or received through another type of communication interface, such as a cabled RS-232, USB or IEEE-1394 connection, or an infrared transmitter/receiver.

The personal gaming device preferably includes means for a player to provide play input. In one embodiment, the display may be touch-sensitive. The personal gaming device may also include buttons or include a microphone for accepting voice input.

In one embodiment, the personal gaming device is associated with a gaming system including a game data server. The processing unit receives game data from a remote location, such as the game data server, via the wireless communication interface and utilizes the game data to present a game to the player, including presenting game video information on the display. In one embodiment, the gaming device includes a player input and the processing unit transmits said input to a remote location via the wireless communication interface.

In one embodiment, a personal gaming device interface serves as an interface between the personal gaming device and one or more devices, including the game data server. The personal gaming device interface may also be associated with other networks and devices, including an Internet gateway, a hotel reservation system, a funds transaction network, or other networks and devices. In this manner, a player may use the personal gaming device to gain access to services, browse the Internet, and engage in other activities or obtain information than simply playing a game.

In a preferred embodiment, if the player wishes to play a game, the player is required to place a bet or ante to participate in winnings (i.e. a casino-type game or wagering game). In that event, a player provides credit, such as by swiping a credit card or a player tracking card associated with a player financial account. If the player's credit is verified, then the player is permitted to play a game or games as selected by the player. The game server generates game data regarding the game to be played, such as video and sound data. This information is transmitted to the personal gaming device, where game video and sound are presented to the player. As necessary, a player may provide input regarding a player's decisions relating to the game, such as via the touch-sensitive screen or a button.

In one embodiment, the personal gaming device stores resident game code. This game code is useful in presenting a game, but alone is incapable of presenting a game. A game server is configured to generate information regarding game results. The game results data is provided to the personal gaming device and used with the resident game code to present a game.

In one embodiment, the game result data or information comprises numerical data generated at least in part by one or more random number generators. The game results data or information may also include paytable information.

In one embodiment, a player may "pre-purchase" game play. In this embodiment, a player provides payment for wagers. The amount of the payment, coupled with the size of the wager for each game, determines the number of games the player may play. The game server is configured to generate game results data for the number of games the player has paid for.

The game results data may be transmitted to the personal gaming device via a wireless communication link. In another embodiment, the game results data is stored on a portable storage device such as a smart card or portable memory module which is capable of being read by the personal gaming device.

One embodiment of the invention comprises a method of activating a personal gaming device. Activation information is generated at a first location, such as by a game server. This activation information is transmitted, such as via a network of wireless transmitters. If the personal gaming device detects the activation information, the personal gaming device is activated, and if not, the device is deactivated. In one embodiment, the activation information is either transmitted at intervals, or is transmitted continuously and confirmed at various intervals.

Various embodiments of the invention comprise methods for verifying the personal gaming device for use and for reconciling game outcomes. In one embodiment, biometric information such as a player's fingerprint is read at the personal gaming device and used to verify the player's entitlement to financial transactions and/or entitlement to play a game. In one embodiment, the outcomes of games played at the personal gaming device are transmitted to a game or financial server. These actual outcomes are reconciled against the outcomes as determined from the generated game results data. The reconciliation step confirms the player's loss or win associated with the play of the game or games.

Further objects, features, and advantages of the present invention over the prior art will become apparent from the detailed description of the drawings which follows, when considered with the attached figures.

DETAILED DESCRIPTION OF THE INVENTION

The invention is personal gaming device and various methods and systems for presenting a game with such a device. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the present invention comprises a personal gaming device. The personal gaming device is adapted to present a game for play by a player. In a preferred embodiment of the invention, at least one game comprises a game of chance, and more particular such a game requiring that a player place a monetary wager in order to be entitled to play the game. In one or more embodiments, as detailed below, the personal gaming device is associated with a gaming network or server.

Figure 1:
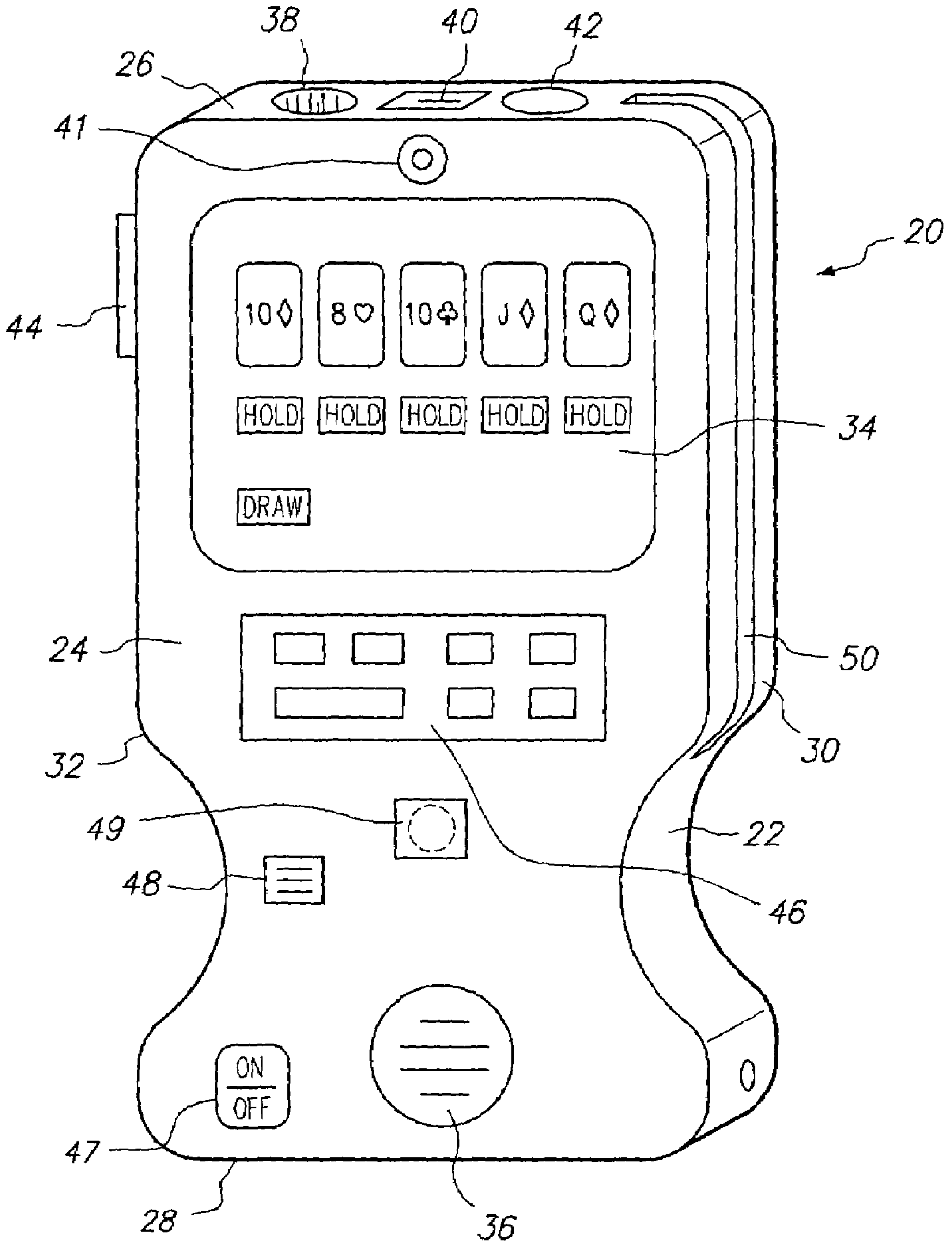
FIG. 1 is a perspective view of a personal gaming device in accordance with an embodiment of the invention.

FIG. 1 illustrates a personal gaming device 20 in accordance with one embodiment of the invention. In general, the personal gaming device 20 includes a body or housing 22. The body 22 may be constructed from a wide variety of materials and in a wide variety of shapes. In one embodiment, the body 22 is constructed from one or more molded polypropylene or other plastic components. The body 22 may be constructed of metal or a wide variety of other materials.

As illustrated, the body 22 is generally rectangular in shape, having a front side or face 24, a rear side or face (not visible), a top end 26, a bottom end 28, a first side 30 and a second side 32. Preferably, the body 22 defines an enclosed interior space (not shown) in which a variety of components are located.

In a preferred embodiment, the personal gaming device 20 is adapted to present video and sound game data to a player. As illustrated, the personal gaming device 20 includes a display 34. The display is located in the front face 24 of the body 22, thus facing upwardly towards a player. In a preferred embodiment, the display 34 comprises a liquid crystal display (LCD), and in particular, an LCD permitting touch-screen input. It will be appreciated that other types of displays may be provided.

The personal gaming device 20 also includes a sound generating device in the form of at least one speaker 36. In one embodiment, the speaker 36 is positioned beneath a top or cover portion of the body 22 having one or more perforations or apertures therein through which the sound may readily travel. As illustrated, the speaker 36 is located near the bottom end 28 of the body 22, generally opposite the display 34. It will be appreciated that the speaker 36 or additional speakers may be provided in a wide variety of locations, such as at one or both sides 30,32 of the body 22.

In a preferred embodiment, the personal gaming device 20 is adapted to send and/or receive data from another device. As such, the personal gaming device 20 includes one or more data input and/or output devices or interfaces. In one embodiment, the personal gaming device 20 includes an RS-232 data port 38 for transmitting and accepting data, such as through a cable extending between the device 20 and another device, such as a computer. In one embodiment, the personal gaming device 20 includes a USB data port 40 for transmitting and accepting data, also through a cable. In one embodiment, the personal gaming device 20 includes an infrared data transmitter/receiver 42 for transmitting information in wireless, infrared light form. In a preferred embodiment, the personal gaming device 20 includes another wireless communication device 44, such as a wireless communication device/interface operating at radio frequency, such as in accordance with the IEEE-802.1x standards or the Bluetooth™ standard.

Preferably, a player is permitted to provide input to the personal gaming device 20, such as for playing a game. As stated above, one means of input may be through the display 34. The display 34 may also be arranged to accept input via a stylus or other device.

In one embodiment, the personal gaming device 20 includes a keypad 46. In one or more embodiments, the keypad 46 is a sealed keypad having one or more keys or buttons which may be activated by a player, such as by depressing the button with their finger.

The personal gaming device 20 includes a microphone 48. The microphone 48 is arranged to accept voice input from a player.

In one embodiment, the personal gaming device 20 includes an image collection device 41, such as a camera. The image collection device 41 may be used, for example, to capture the image of a user or player of the personal gaming device 20. This image information may be used for security or authentication purposes.

The personal gaming device 20 may also include a fingerprint scanner 49. In one embodiment, as illustrated, the fingerprint scanner 49 may be located behind or beneath a user input button, such as a "spin" or "draw" button. In this manner, a player's fingerprint may be obtained without the user or player having to consciously participate. As described below, a player's scanned fingerprint information may be used for authentication purposes. Such a scanning device may be similar to that offered by AuthenTec, Inc. of Melbourne, Fla.

The personal gaming device 20 may include a card reader 50. As illustrated, the card reader 50 is located in a side 30 of the body 22 of the device 20. In a preferred embodiment, the card reader 50 comprises a magnetic stripe reader for reading information from a magnetic strip of a card. The card reader may also be adapted to write or store data to a smart card or portable memory module. As illustrated, the card reader 50 includes a slot which is positioned in the side 30 of the device 20.

Other input devices may alternatively be provided or be provided in addition to those input devices described. For example, a player may be permitted to provide input through a joystick (not shown). The joystick may comprise a control element associated directly with the body 22 of the device 20. Alternatively, the joystick may be separate from the personal gaming device 20, and then be placed in communication therewith, such as by plugging in the joystick to a data port of the device 20. A smart card reader, optical reader or other input device may be provided for reading information from another element, such as a card, ticket or the like. The personal gaming device 20 may also include a keyboard or mouse.

The personal gaming device 20 may be battery-powered, such as with a rechargeable battery pack. An ON/OFF button 47 may be provided for controlling the power to the device 20.

Figure 2:
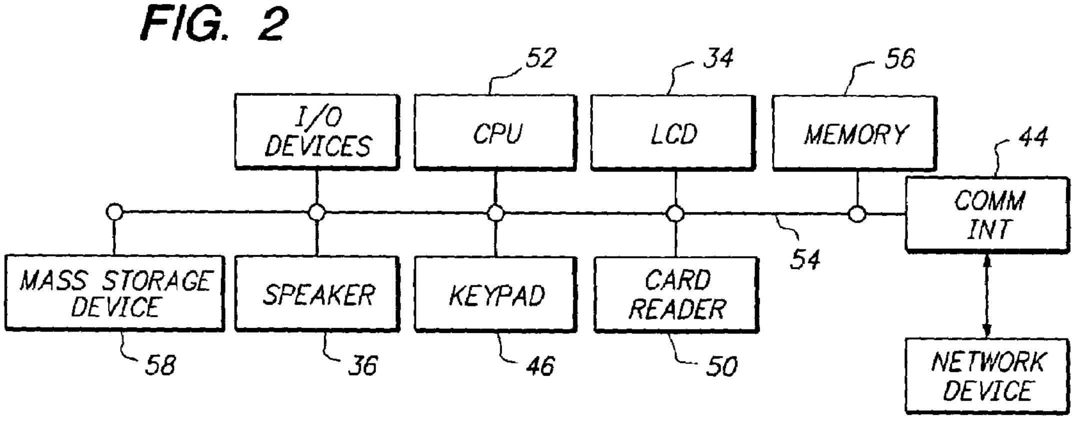
FIG. 2 is a block diagram of a component arrangement of the personal gaming device illustrated in FIG. 1.

Preferably, the personal gaming device 20 includes control means for controlling the operation of the device 20, including accepting input and providing output. One embodiment of such a control means is illustrated in FIG. 2.

As illustrated, the personal gaming device 20 preferably includes a computing environment serving as the control means. The computing environment includes a central processing unit 52. The central processing unit 52 preferably comprises a microprocessor, such as those well known and manufactured by such companies as Intel, AMD, Transmeta and Sun Microsystems, Inc.

The central processing unit 52 is associated with a bi-directional system bus 54. The system bus 54 may contain, for example, thirty-two address lines for addressing a video memory or main memory. In addition, the system bus 54 preferably includes a thirty-two or sixty-four bit data bus for transferring data between and among components associated with the bus 54. Alternatively, multiplex data/address lines may be used instead of separate data and address lines.

The display 34 is coupled to the bus 54. In one embodiment, a video memory (not shown) is provided in association with the bus 54. The video memory may be dual-ported video random access memory. The video memory is preferably coupled to and arranged to drive the LCD display 34. Of course, the video memory might be coupled to a CRT or other suitable display device.

A memory 56 is associated with the system bus 54. In one embodiment, the memory 56 comprises dynamic random access memory (DRAM), synchronous DRAM or other forms of random access memory. The memory 56 may have other forms as well, such as electronically erasable programmable read only memory (EEPROM). Preferably, the memory 56 is of the type which permits data to be written thereto and read therefrom. A mass storage device 58 is preferably also accessible via the bus 54. The mass storage device 58 may be of the read-only type (such as a CD or DVD optical drive) or may be of the read-and-write variety such as flash memory, compact flash, or CD/DVD-R/W drives.

As illustrated, the variety of input and output devices are associated with the system bus 54, and thus the other components associated with the bus. As illustrated, the speaker 36, keypad 46 and card reader 50 are associated with the system bus 54. A variety of data input/output devices ("I/O Devices") may also associated with the system bus 54, such as, though not specifically illustrated, the RS-232 port 38, the USB 40, and the infrared communication transmitter/receiver 42. As will be appreciated, these devices/elements may operate in accordance with different protocols and have different architectures, and have appropriate interfaces provided for communicating with the system bus 54. For example, the infrared transmitter/receiver may have different layers, including a physical layer including the light-emitting device, and link and other layers which include software and/or hardware, as is known. A variety of other input/output devices may be associated with the personal gaming device 20, as now known or later developed.

Preferably, as stated above, the personal gaming device 20 includes a wireless, radio frequency, communication interface operating in accordance with the IEEE 802.1x or Bluetooth™ standards. The architectures/protocols of such wireless communication interfaces are well known and thus will not be described in detail herein. In general, however, such an interface 44 permits two-way data communication. As described in detail, the personal gaming device 20 may be permitted to communicate with a wide variety of devices/systems, including at least one device associated with a gaming network.

In accordance with the invention, the personal gaming device 20 can send data and receive data, including program code, through the communication interface 44 (or the other input/output devices, such as the infrared transmitter/receiver). As one example described in more detail below, a gaming server may transmit requested code for an application via a transceiver to the communication interface 44 of the personal gaming device 20. The received code may be executed by the central processing unit 52 as it is received and/or be stored in the memory 56 for later execution.

In one embodiment, the personal gaming device 20 may include a mass data storage device (not shown) such as a hard drive, CD-ROM or the like. In one or more embodiments, the memory 56 may comprise a smart card or similar easily removable (and replaceable) device. In such event, data, such as operating code, may be associated with the personal gaming device 20 via a CD-ROM placed in a CD-ROM drive or by insertion of a coded smart card or portable memory module.

In one or more embodiments, the personal gaming device 20 is associated with a gaming system. In a preferred embodiment, the personal gaming device 20 is only operable or at least incapable of presenting certain functions or features unless associated with such a system.

Figure 3:
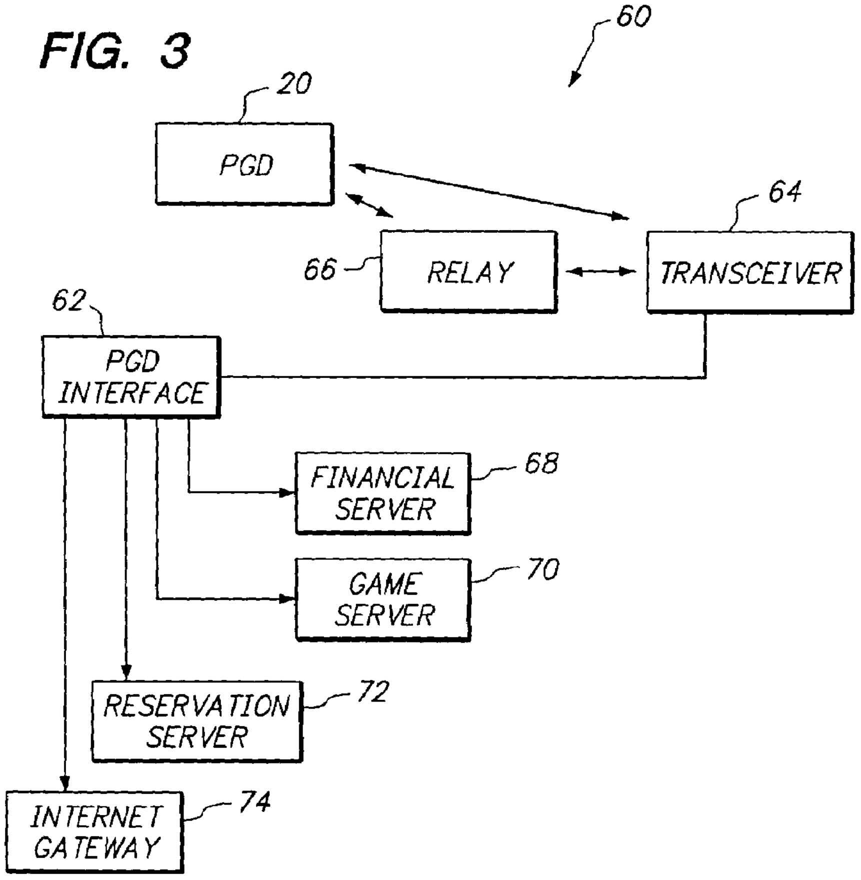
FIG. 3 is a schematic of a gaming system including a personal gaming device in accordance with the invention.

A gaming system 60 in accordance with one embodiment of the invention is illustrated in FIG. 3. As illustrated therein, the gaming server 60 includes a personal gaming device interface 62. The personal gaming device interface 62 serves as a gateway to data communications between the personal gaming device 20 and various networks, servers and other devices. In one embodiment, data communications between the personal gaming device 20 and the personal gaming device interface 62 is via a transceiver 64 associated with the personal gaming device interface 62. In general, the transceiver is arranged to receive information from the personal gaming device interface 62 and transmit it to the personal gaming device 20, or receive information from the personal gaming device 20.

As illustrated, a personal gaming device 20 may communicate directly with the transceiver 64. It will be appreciated, however, that limitations exist as to the range over which such data can be accurately transmitted. Therefore, in one or more embodiments, one or more relays 66 may be provided for receiving and re-transmitting the data to the appropriate location.

As stated above, in a preferred embodiment, the personal gaming device interface 62 serves as a gateway or interface between the one or more personal gaming devices 20 and one or more other devices, systems or networks. The interface 62, whether in the form of a wireless interface or a docking station (as described in more detail below), may be associated with or reside in a kiosk, slot or other type of gaming machine, a point of sale device, a personal computer or the like.

Figure 9:
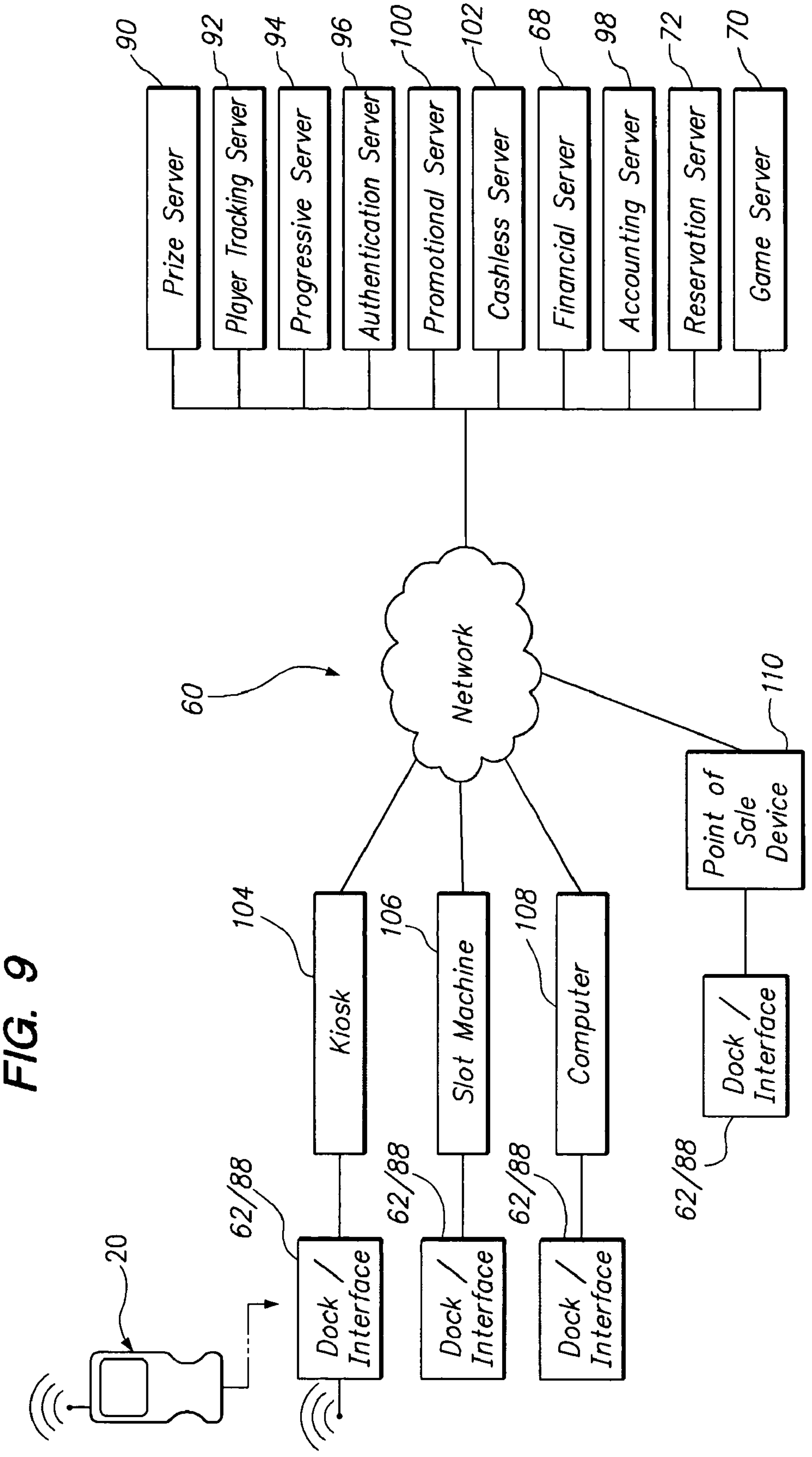
FIG. 9 illustrates yet another embodiment of a system in accordance with the invention.

As illustrated, in one embodiment, the personal gaming device interface 62 is associated with a financial server 68 either via a direct link (as illustrated in FIG. 3) or via a network (as illustrated in FIG. 9). The financial server 68 may be a computer or be associated with a computer having a processing unit and one or more data files. The financial server 68 is preferably arranged to confirm financial transaction data. For example, in order for player to be permitted to play a game using the personal gaming device 20, the player may be required to place a bet. In one embodiment, the bet may be placed using a credit card. In such event, the player may swipe their credit card using the card reader 50 associated with the personal gaming device 20. This data may be transmitted to the financial server 68 for confirmation (and as is well known in the art, generation of financial transaction data, such as a transaction date, time and value).

In one embodiment, the system 60 includes a game server 70. As illustrated, the game server 70 is associated with the personal gaming device interface 62, either directly or via a network. In one or more embodiments, the game server 70 is, or is associated with, a computing device, such as a processor adapted to execute game code. Preferably, the game server 70 is arranged to provide game data to the personal gaming device 20 via the interface 62. This game data may comprise video data for generating an image on the display 34 of the personal gaming device 20, and sound data for generating sound emitted by the speaker 36. The game server 70 is preferably also adapted to receive input from a player, such as a player selection during the play of a game.

In one embodiment, a reservation server 72 is connected to the personal gaming device interface 62, either directly or via a network. The reservation server 72 may be arranged to accept reservation selections, and provide information regarding available hotel rooms, rates, shows, restaurants and the like for use by a player of the personal gaming device 20 in making a reservation selection.

While the personal gaming device 20 may communicate with other devices via direct network links as illustrated in FIG. 2, the personal gaming device 20 may communicate with a variety of other devices via a network, as illustrated in FIG. 9. For example, the personal gaming device 20 may communicate with a prize server 90, a player tracking server 92, a progressive server 94, an authentication server 96, an accounting server 98, a promotional server 100, and a cashless transaction server 102, among others in addition to the gaming sever 70 and financial server 68, via a network.

Figure 8:
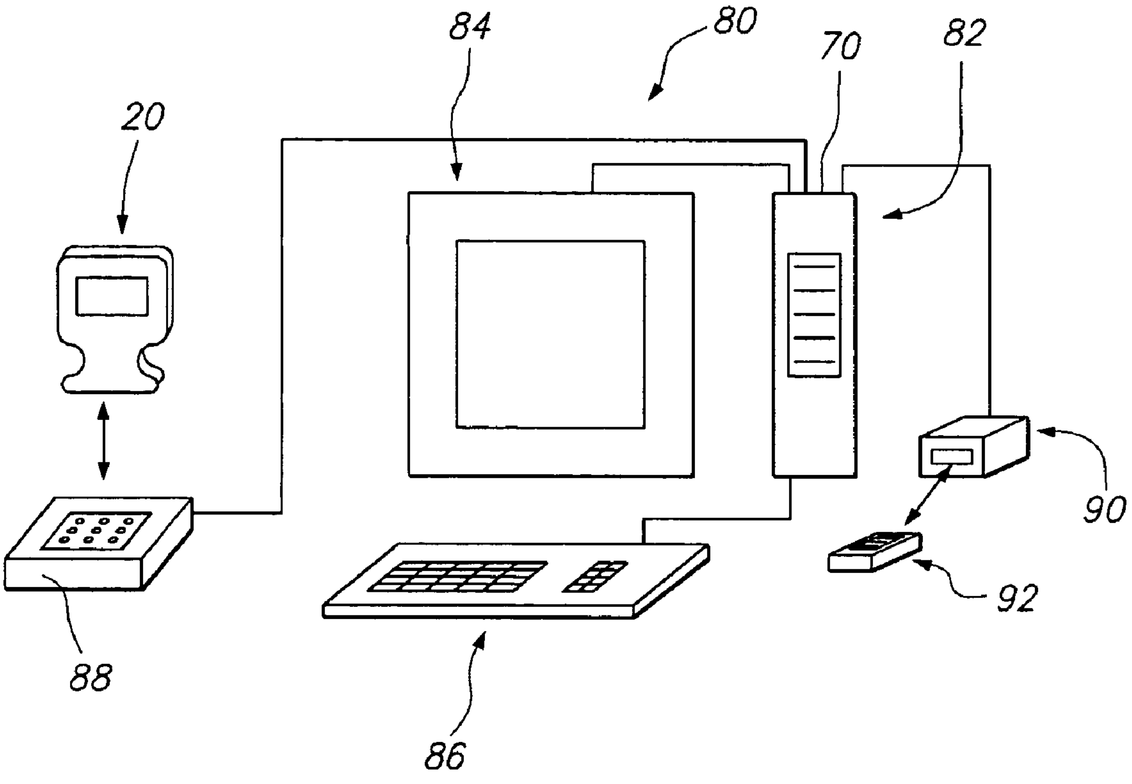
FIG. 8 illustrates a docking station of the invention.

As described below, the personal gaming device 20 may communicate with these other devices via a wireless communication link with the wireless communication interface 62 or, referring to FIG. 8, via a direct connection with a docking station 88. Referring to FIG. 9, the interface 62 and/or docking station 88 may in turn be associated with or integrated into a kiosk 104, a slot or other type of gaming machine 106, a personal computer 108, or a point of sale device 110 or the like. These devices may then be connected to or associated with a network.

In one embodiment, as illustrated in FIG. 2, the personal gaming device interface 70 is connected to an Internet gateway 74. This Internet gateway may comprise a computing device which is coupled to the Internet, such as through an Internet service provider. In one embodiment, as illustrated in FIG. 9, the Internet may comprise or be part of the network which allows the personal gaming device 20 to connect to a variety of other devices, such as the servers. In another embodiment, the network may comprise a dedicated gaming network with which these devices are associated.

The personal gaming device interface 62 may be arranged to facilitate communication between devices, systems and networks operating in accordance with differing protocols. For example, the personal gaming device interface 62 may be arranged to communicate with the personal gaming device 20 in accordance with a wireless IEEE 802.1x standard. On the other hand, the personal gaming device interface 62 may be arranged to communicate with the financial, game, reservation and other servers operating in accordance with an IEEE 1394 ("Firewire") protocol, or Ethernet or the like. In addition, the personal gaming device interface 62 may be arranged to communicate with the Internet gateway 74 in accordance with a PPP or SLIP protocol.

As will be appreciated, the data which is transmitted to and from the personal gaming device 20 is preferably provided with an address or other identifier of the intended destination of the information. This address information is used by the personal gaming device interface 62 for directing data received from a personal gaming device 20 to a particular destination, such as the game server 70. Likewise, data which is directed to a personal gaming device 20 preferably has an address associated therewith for identifying the particular intended destination. It will be appreciated that more than one personal gaming device 20 may be associated with the interface 62, such that a unique address or identifier is necessary to properly associate data with its intended destination.

In one or more embodiments, the personal gaming device 20 may be programmed with a specific address or other security information, such as a password to prevent association of unauthorized devices with the system 60. In one embodiment, each personal gaming device 20 may implement a data encryption/decryption scheme such as RSA or DSA. Some or all of the information or data which is transmitted to or from the personal gaming device 20 may be encrypted to prevent its interception and use by unauthorized users. The encryption/decryption key(s) may be associated with the personal gaming device 20 with a module or similar removable device. A user may be required to obtain a module in order for the device 20 to function.

One method of using a personal gaming device such as the personal gaming device 20 illustrated in FIG. 1 will now be described.

First, a player obtains a personal gaming device 20. In one arrangement, a casino may allow a player to check out a personal gaming device 20. For example, a casino may have a central desk or station at which a player may obtain a personal gaming device 20. In one embodiment, a player may be required to leave a deposit to check the device out, helping ensure that the player will return the device when they are done using it.

In one embodiment, a player may also be permitted to purchase a personal gaming device 20. Having obtained a device, the player may be able to use the device at a variety of locations, including at a kiosk, slot machine, casino area, personal computer or the like (see FIG. 9). In another embodiment, a player may be required to rent the device, such as by paying a fee for the time which the player uses it.

Once the player has obtained a personal gaming device 20, the user may be permitted to engage in one or more activities. In one embodiment, some activities may be presented by the personal gaming device 20 itself. For example, software code may be stored in the memory 56 for execution by the processing unit 52 for permitting certain functions, such as the playing of music, display of "how to use" or "help" information and the like.

Preferably, however, the number of functions which are fully supported by the personal gaming device 20 are limited. This limits the total amount of memory which the personal gaming device 20 needs to include. Thus, one or more functions or activities are supported only by associating the personal gaming device 20 with a gaming system such as that illustrated in FIG. 3.

In one embodiment, when the personal gaming device 20 is turned on, such as with the ON/OFF button 47, the personal gaming device 20 is adapted to send a signal to the personal gaming device interface 62 or other device for establishing a communication link. Once this communication link is provided, data may be transmitted to and from the personal gaming device 20 and the other networks/systems/devices.

Once a communication link is established, master menu information may be transmitted from the personal gaming device interface 62. For example, casino personnel may generate menu information and load it into a memory associated with the personal gaming device interface 62. Upon a personal gaming device 20 establishing a communication link with the personal gaming device interface 62, the menu information may be transmitted to the personal gaming device 20 for display thereon.

A player may then select one or more activities or functions from the displayed menu. Input may be provided by touching an area of the screen 34 associated with a menu item, providing keypad entry, or in other manners. In one embodiment, a player may be permitted to engage in activities or obtain services at no charge. For example, a player may be permitted to access the Internet using the personal gaming device 20 at no charge to the player. The player may also be permitted to obtain show, ticket, hotel, restaurant and other information and place reservations and the like at no charge.

In one or more embodiments, a player is required to pay to engage in one or more activities. In a preferred embodiment, a player is required to place a bet or ante in order to play one or more games. Of course, one or more games may be provided for free. Alternatively, a player may be required to place a bet or ante if the player is to be entitled to an award or winning if the outcome of the game is a winning outcome. In another embodiment, the casino or other party may give away prizes. For example, a player may be permitted to play in one or more complimentary games, with the player being awarded a prize (money, a hotel night stay, free dinner or the like) in the event the player is a winner of the game.

In the event the player is required to place a bet or desires to place a bet, the player may do so in a variety of manners. In one embodiment, the player may provide credit or value using a credit card. As described above, the player may swipe their credit card with the card reader 50. Data read from the player's card may be transmitted from the personal gaming device 20 to a financial server for verification. In another embodiment, a player may place a deposit with the gaming operator and be provided with a player card. For example, when the player checks out the personal gaming device 20, the player may place a monetary deposit or credit deposit. The deposit may be associated with a player's account and/or a player card. The deposit data may be stored in a master database, with a particular file being assigned an identifier. That identifier may be stored on the player card. Later, the player may swipe their player card. The read identifier may be transmitted and the deposit data obtained from the corresponding file.

A variety of other methods may be provided for the player providing the credit or value. For example, a player may be provided with an encoded ticket (bar code or the like), or a smart card or other element having data which provides verification of the player's credit or payment.

In one embodiment, the player may select the amount of the bet or ante by providing input to the personal gaming device 20. For example, once a player has selected a game for play, a gaming server may transmit bet screen data. The bet screen may indicate to a player that the player may bet anywhere from 1 to 5 credits, each credit having a value (such as $0.25 U.S., $1.00 U.S. or the like). The player may select the desired bet. Upon receiving the data, the game server may instruct the player to provide the necessary credit, such as by swiping the credit card.

In one embodiment, a player may create a bank of credits from which the player may place bets. For example, a player may be permitted to place a large deposit with the operator or may use their credit card to create a large deposit. This deposit may be associated with an account of the player. The total credit of the player may be displayed by the personal gaming device 20. Such an arrangement may be similar to that of current game machines were a player may provide a $20 bill to generate 20 $1 credits, with the number of credits indicated to the player.

Once verification has been provided of the player's bet or ante, the player may be permitted to play the game. In a preferred embodiment, the game data is generated by the game server 70 and transmitted to the personal gaming device 20. FIG. 1 illustrates an embodiment of a personal gaming device 20 which is displaying a screen of a game of video poker, the screen displaying cards and instructions to the player. The player may provide input to the game server 70 as necessary.

In one embodiment, a player may be permitted to raise their bet or ante, or otherwise place other bets, during the course of the game. In such event, the player may provide credit as described above.

Depending on the outcome of the game, an award or winning may be provided to the player. In one embodiment, a winning is associated with an account of the player or may be credited to the credit card account of the player. In another embodiment, the device 20 may include a ticket printer or other device for issuing an element having the value associated therewith (or at least data regarding the value the player won). At the end of a game or group of games, the result(s) are uploaded to the accounting server (if a communication link is present), or stored in a secure memory for later upload and reconciliation (if a communication link between the personal gaming device and the accounting server is not present).

A player may play any number of games, switch to other activities, or return the personal gaming device 20 at any time.

In one or more embodiments, means may be provided for ensuring that the personal gaming devices 20 are returned and not stolen. First, in one embodiment, the personal gaming devices 20 may be restricted to use in a particular area. For example, use of the devices may be permitted only in a particular game room. By monitoring the exits, the theft or loss of the personal gaming devices 20 may be controlled.

In another embodiment, a "fence" may be created which, if the personal gaming device 20 is crossed over, results in one or more security measures being activated. The fence may comprise one or more emitters which emit a signal detectable in a restricted area by the personal gaming device 20. Upon detecting the signal, the personal gaming device 20 may be arranged to generate a loud audible signal (such as by speaker 36) warning that the personal gaming device 20 is being removed from the authorized area. The personal gaming device 20 may also be arranged to display a warning message to a player. In one embodiment, the memory of the personal gaming device 20 may be erased, preventing the player's further use of the device (without returning it back to the gaming operator for resetting the device) and protecting the gaming operator by preventing the player from obtaining any critical information which would otherwise be associated with the device. In another embodiment, operation of the personal gaming device 20 is simply disabled when a network or communication connection is not present. In this manner, the personal gaming device 20 is operable only within a limited, defined perimeter.

In this regard, one advantage of the personal gaming device 20 is that it may be configured so that gaming code is not stored or resident at the personal gaming device 20 except during use. In particular, the gaming code which is utilized to present and play the game is stored remotely, such as at the game server 70. The game data may be transferred to the personal gaming device 20 only upon authorization for presenting a game. Therefore, even theft of the device would not result in the thief obtaining proprietary, important game code.

In one or more embodiments of the invention, the personal gaming device 20 may be "customized" for a particular player. In one embodiment, a player may create a player account. This account may not only include credit information, but may include player preference information. For example, a player may designate that they prefer to play a particular game and place bets in a particular denomination. These preferences may be indicated by a player on a sign-up sheet which is then used to create the account, or by input to a program interface which player's may use to generate their accounts.

The personal gaming device 20 may be customized in other manners. For example, the personal gaming device 20 may be configured to display information via a graphical user interface. The color(s) of elements of the interface may be personalized. In addition, menus, "button" layout and the like may also be customized.

In one embodiment, the player preferences may also be stored on a player card or other portable input device. For example, at the time a player creates a player account, they may input their preferences. These preferences may be stored on a portable card. The player may use the personal gaming device 20 to read the personal information and configure itself accordingly.

In one embodiment, the player is issued a player card which includes information regarding the player's account. When the player swipes their player card using the card reader 50 of the personal gaming device 20, information may be provided regarding the player's account, such as the account number. The player's account may then be accessed and the information therein be used to personalize the gaming device 20. For example, the player's account information may be used by the personal gaming device interface 62 to generate a personalized menu for display, or to automatically present the player's favorite game as customized with the player's default bet.

Additional embodiments of the invention will be described with reference to FIGS. 4-7. These figures illustrate an embodiment of a method of presenting a game using a gaming device, such as the personal gaming device 20 described above. Various other features of the invention are illustrated therein and will be described below in conjunction with this method, it being understood that the features may be implemented alone or other combinations and method of use.

Figure 4:
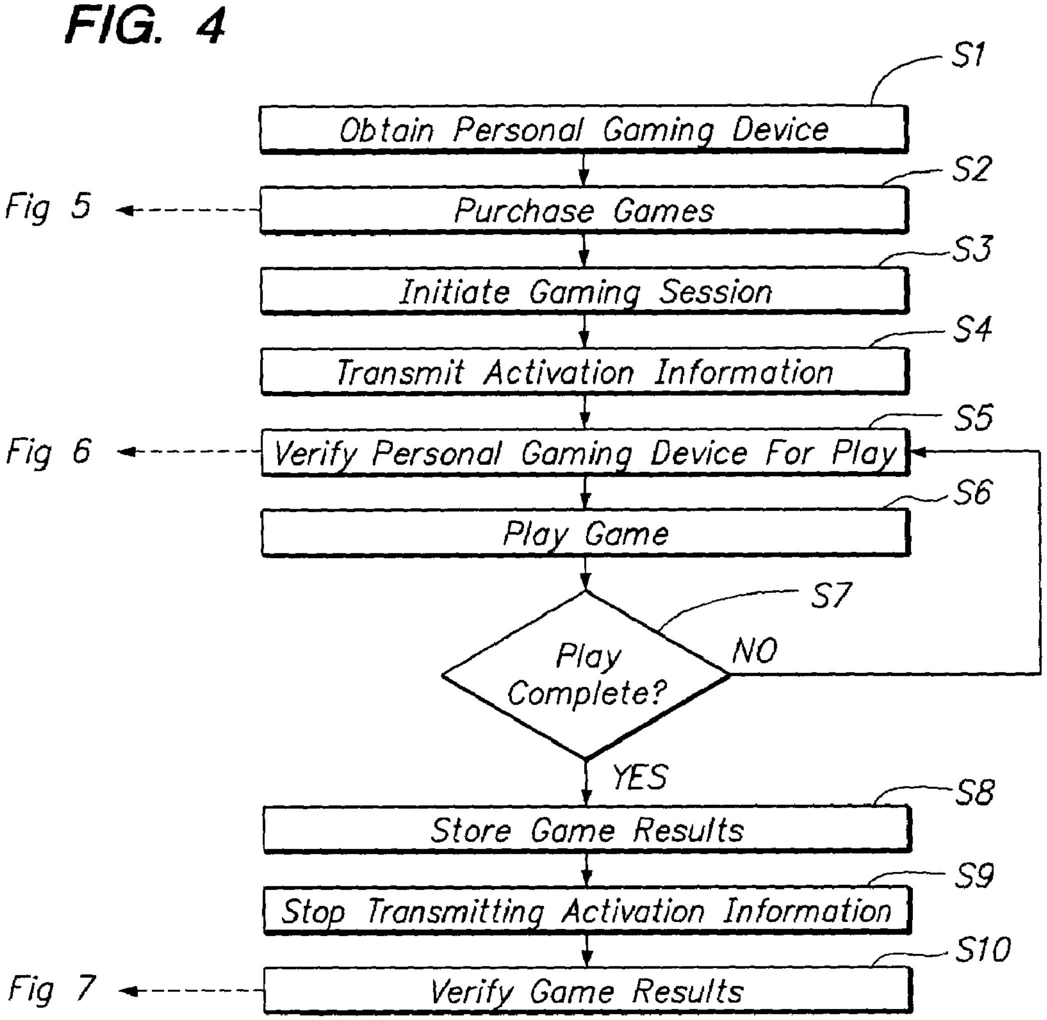
FIG. 4 is a flowchart illustrating a method of presenting a game with a personal gaming device in accordance with one embodiment of the invention.

FIG. 4 illustrates one method of presenting a game in accordance with the invention. As indicated, the method may be implemented via a system 60 such as that described above, the system including one or more personal gaming devices 20.

As illustrated, a method of the invention starts with a step SI in which a player obtains a gaming device. The gaming device may be of a variety of types, such as a personal gaming device 20 as described above, a personal data assistant (PDA), laptop or other device. The device may or may not be portable, and may be located remote from other devices of the system.

In a step S2, a player purchases or otherwise obtains the right to play one or more games. One such method will be described in detail with reference to FIG. 5.

Figure 5:
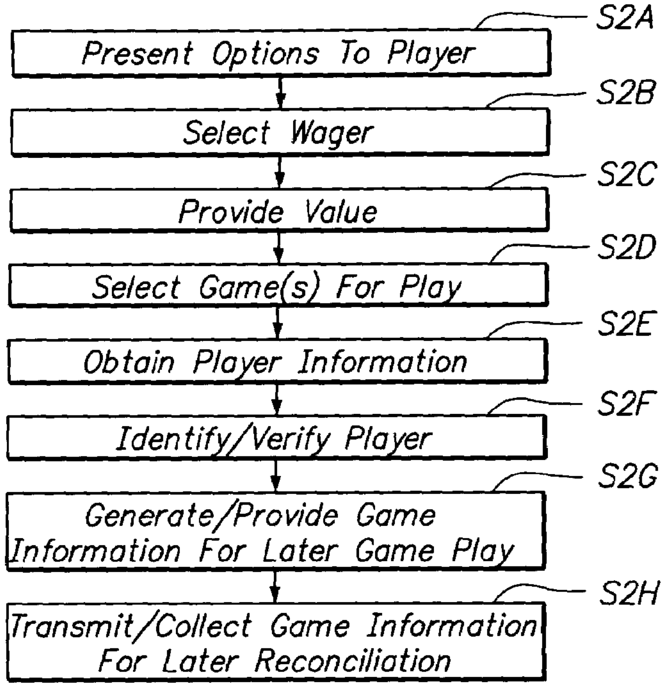
FIG. 5 is a flowchart illustrating one method of purchasing games for play on a personal gaming device.

As illustrated in FIG. 5, in a step S2A, the player is preferably presented with at least the option to purchase one or more game play events. As illustrated, the player may also be presented with a variety of other options, such as options relating to a player account. As described above, a player may have an account which the player uses to provide value, such as for purchasing games or placing wagers. The account may be associated with a bank or other financial entity, or may be associated with the casino or game presenter.

In the embodiment illustrated, the player is presented the option to (a) reconcile an account; (b) purchase games; (c) review or make an inquiry regarding an account; (d) withdraw cash or (e) deposit cash. Options (a) and (c)-(e) will not be described in detail herein, as they may be implemented in a variety of fashions. These options may, however, be associated with various methods permitting a user to access an account, make deposits, make withdrawals, obtain account information and the like.

If the player selects option (b), then in a Step S2B, the player is permitted to purchase one or more games or game events. This function may be accomplished in a variety of manners. In one embodiment, this selection causes the personal gaming device 20 to connect to the game server 70. Preferably, the player then selects or inputs the amount to be wagered. For example, the player may elect to play $100.00 worth of games.

In a step S2C, the player provides value representing the amount the player has elected to wager. As described above, a player may use a credit card to provide this payment. If the personal gaming device 20 is so configured, such as by including a bill validator or coin acceptor, the player may also use currency. In one embodiment, the player may utilize a player financial account established with a casino or other game provider. The provided value may comprise other than monetary value, such as player points or other indicia which the game provider will accept.

In a step S2D, the player selects one or more games to play. In one embodiment, the player may be presented with a menu of games to select from. A player may select a single game or multiple games for play.

In one embodiment, the player may be provided with information regarding the number of games to be played in relation to the amount bet. For example, a player may elect to wager $100.00 playing games of video poker. The player may then be requested to indicate how much they wish to wager on each particular game. For example, the player may be required to indicate whether they wish to wager $0.025 or $1.00 per game, or a default bet may apply to one or more of the games. If the player selects or the default bet is $1.00 per game and the player has wagered $100.00, then the game server may indicate to the player that they are entitled to play 100 games of video poker.

It will be appreciated that the general purpose of the above-described steps is to define the number of games that the player wishes to play and has provided a wager or payment to play. As described, the number of games may vary dependent upon a number of factors, including the total amount the player wishes to wager and the amount of the wager per game or cost to play each game. Thus, the steps may vary depending on various factors. For example, game play packages may be offered for player selection. A game play package might comprise the option to play 25 video poker games at $1.00 per game for a certain wager, such as $25.00, or even at a discount. In this example, the player may only need to select one of the game play packages and provide the appropriate wager.

Next, the identity of the player and/or the right of the player to play the game may be verified. In one embodiment, in a step S2E, certain information regarding the player is obtained. As illustrated, this information comprises biometric information, such as a player's fingerprint. In a step S2F, the collected information is used to identify the player and/or verify their entitlement to play the games. In one embodiment, this comprises comparing the collected biometric information with stored biometric information. For example, when a player sets up their financial account with the casino, or in order to check out a personal gaming device 20, the player may be required to provide biometric information. This information is stored for use in the verification process.

It will be appreciated that other information may be used to identify the player and/or verify entitlement to play a game. For example, verification may be accomplished through use of identifiers such as passwords or the like. Other biometrics may be used, such as a retina scan, facial features (such as via capture of the player's image with the camera 41), or via other authentication.

In one embodiment, the verification step includes verifying that the player is of legal age to play the game. In one embodiment, only players whose age has been verified are allowed to set up an account or obtain a personal gaming device 20. In this configuration, verification is assured once a player's biometric information matches, since the player could not access the account or device without being legal age in the first instance. This prevents, for example, adolescents from using the personal gaming device 20 to play a game, as well as preventing third parties other than the player from using the personal gaming device 20.

In a step S2G, the game server 70 provides game information. In one embodiment, as described above, this may comprise the download of game code to the personal gaming device 20. The game code may comprise actual executable code which enables the personal gaming device 20 to present the game or games the player selected.

In a preferred embodiment of the invention, base game code is stored or resides at the personal gaming device 20. This game code does not by itself, however, permit the personal gaming device 20 to present a game. In this configuration, additional code or data must be supplied to the personal gaming device 20 in order for the personal gaming device 20 to present the game.

In one embodiment, the gaming server 70 is configured to transmit game result and/or paytable information. The game result information preferably comprises randomly generated game outcome data which, when provided to the personal gaming device 20, causes the personal gaming device 20 to present a game having the particular outcome associated with the outcome data. For example, the game outcome data may comprise random number generated results, such as a numerical code which, when provided to the gaming code, causes the gaming code to present a game having that corresponding outcome. In the case of a "slot" type game, the outcome code may represent the winning outcome "three cherries." In other embodiments, the outcome code may comprise more detailed data for use presenting the game using the game code. For example, the data may represent certain cards to be dealt to the player in the game of Blackjack, as well as the possible additional cards which may be selected by the player based upon the cards they wish to discard.

It will be appreciated that the data provided to the personal gaming device 20 by the game server 70 may depend upon the number of games to be played. For example, in the example provided above in which a player has elected to wager $100.00 on $1.00 per bet games, the gaming server must provide information regarding 100 games.

As indicated, the data may also comprise paytable data. This data is useful is calculating the outcome and/or payoff of a winning outcome. It will be appreciated that the paytable is generally independent of the outcome of the game, but may vary depending upon the amount wagered. Thus, the paytable is necessary to compute the amount won when players may select differing wager amounts.

In one embodiment, additional data is provided to the personal gaming device 20. This data may include biometric data regarding the player and global positioning system (GPS) data.

Once the data or information has been provided to the personal gaming device 20, in step S2H, the gaming server 70 preferably sends information to the financial server 68 for later reconciliation. This information may comprise, for example, data regarding the win or loss associated with each game for which data was provided to the personal gaming device 20. In this manner, as the player plays the games, the win and loss associated with each game can be tracked and verified.

Referring again to FIG. 4, in a step S3, the player initiates a gaming session. The player obtains a personal gaming device 20 or other gaming device such as described above. The player may be required to obtain the device from a particular source, may simply turn on the device or the like in order to initiate the session.

In a preferred embodiment, in a step S4, communication is initiated between the game server 70 and the personal gaming device 20. In one embodiment, information is transmitted from the game server 70 to the personal gaming device 20 which, when received by the personal gaming device 20, maintains the personal gaming device 20 in mode in which it will present a game. As such, the information may be referred to as "activation information." The information may comprise data which is intermittently transmitted to the personal gaming device 20. The interval between information transmissions may vary, but may be 5-30 seconds.

Preferably, the activation is transmitted via a wireless communication link. Preferably, the transceiver 64 and various relays 66 are configured, including in their number, location and power, to create a "game zone" within which the personal gaming device 20 will receive the activation information. Preferably, outside of this zone, the activation information is not received by the personal gaming device 20.

In a preferred embodiment, when the personal gaming device 20 does not receive activation information for a certain period of time, the personal gaming device 20 is configured to automatically prevent further game play. In this manner, a user of the personal gaming device 20 is not permitted to engage in game play other than in certain designated areas, such as a proscribed gaming zone or in a casino.

In one embodiment, certain features of the personal gaming device 20 may remain activated independent of the activation information. For example, various other menu features such as those permitting the player to preview games and the like may still remain active. When the player is playing games via other than a personal gaming device 20, such as a PDA or the like, various features thereof may remain activated, such as those which are independent of game play.

Figure 6:
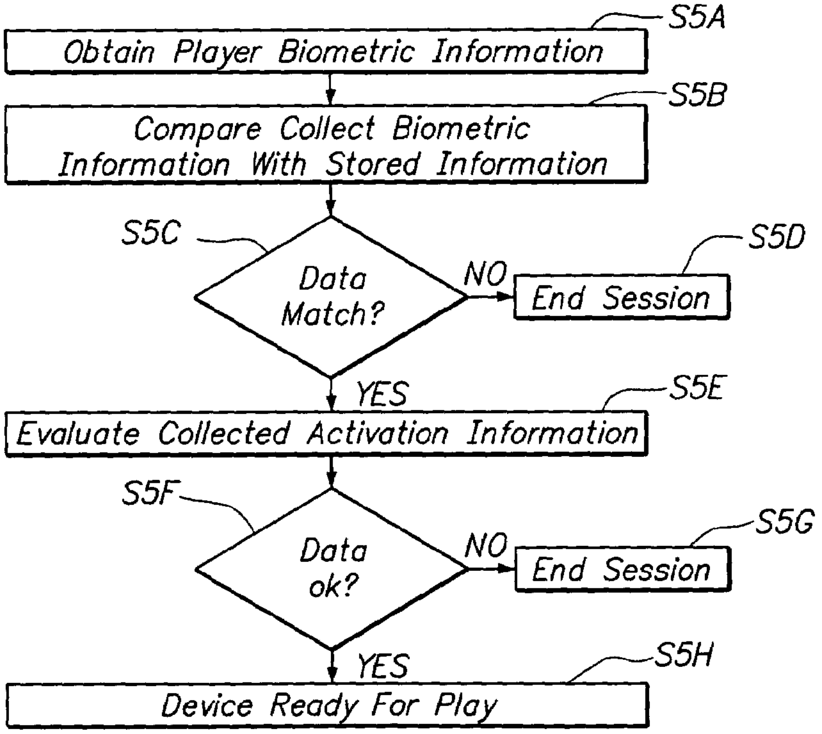
FIG. 6 is a flowchart illustrating one method of verifying a personal gaming device for game play in accordance with the invention.

In one embodiment, in a step S5, the personal gaming device 20 is verified for game play. FIG. 6 illustrates one example of such a method, it being understood that other methods may be used.

Referring to FIG. 6, in a step S5A, biometric information is obtained from the player. In one embodiment, this may comprise reading fingerprint information using a fingerprint reader 49 at the personal gaming device 20. In addition, in one embodiment, GPS data is obtained by the personal gaming device 20 regarding the location of the personal gaming device 20.

In a step S5B, the biometric information is preferably compared to the previously obtained biometric information (see step SIG, FIG. 5). If in a step S5C, the biometric information does not match, then the session is ended in a step S5D. In other embodiments, if the biometric information does not match, the player may be requested to, one or more additional times, try to match the biometric information, such as by rescanning their fingerprint.

If the biometric information matches, then in a step S5E, the activation information from the game server 68 is evaluated. This may comprise evaluating the quality or time of receipt of the information and determining if certain standards or requirements are met. If the activation information does not meet the requirements, then in a step S5G, the session is terminated.

If the activation information does meet the requirements, then in a step S5H, the personal gaming device 20 is verified for game play. Referring to FIG. 4 again, in a step S6, the player is then permitted to engage in game play. In one embodiment, one of the games selected by the player for play is presented to the player.

Preferably, at a step S7, it is determined if additional games remain to be played and if the player wishes to continue playing. If so, then the personal gaming device 20 is preferably re-verified in step S5 before the next game is presented for play.

As described above, in a preferred embodiment, when a game is presented for play, the personal gaming device 20 uses resident game code along with downloaded game data in order to present the game. The game data may comprise data representing certain "outcomes" for the games to be played.

If the player wishes to stop playing or all games have been played, then in a step S8, the results of the game or games played are preferably stored at the personal gaming device 20. These game results are transmitted to the game server 70 for verification.

In a step S9, once game play has ceased, the game server 70 stops transmitting activation information, thus preventing any further use by the player of the personal gaming device 20 in playing games.

Figure 7:
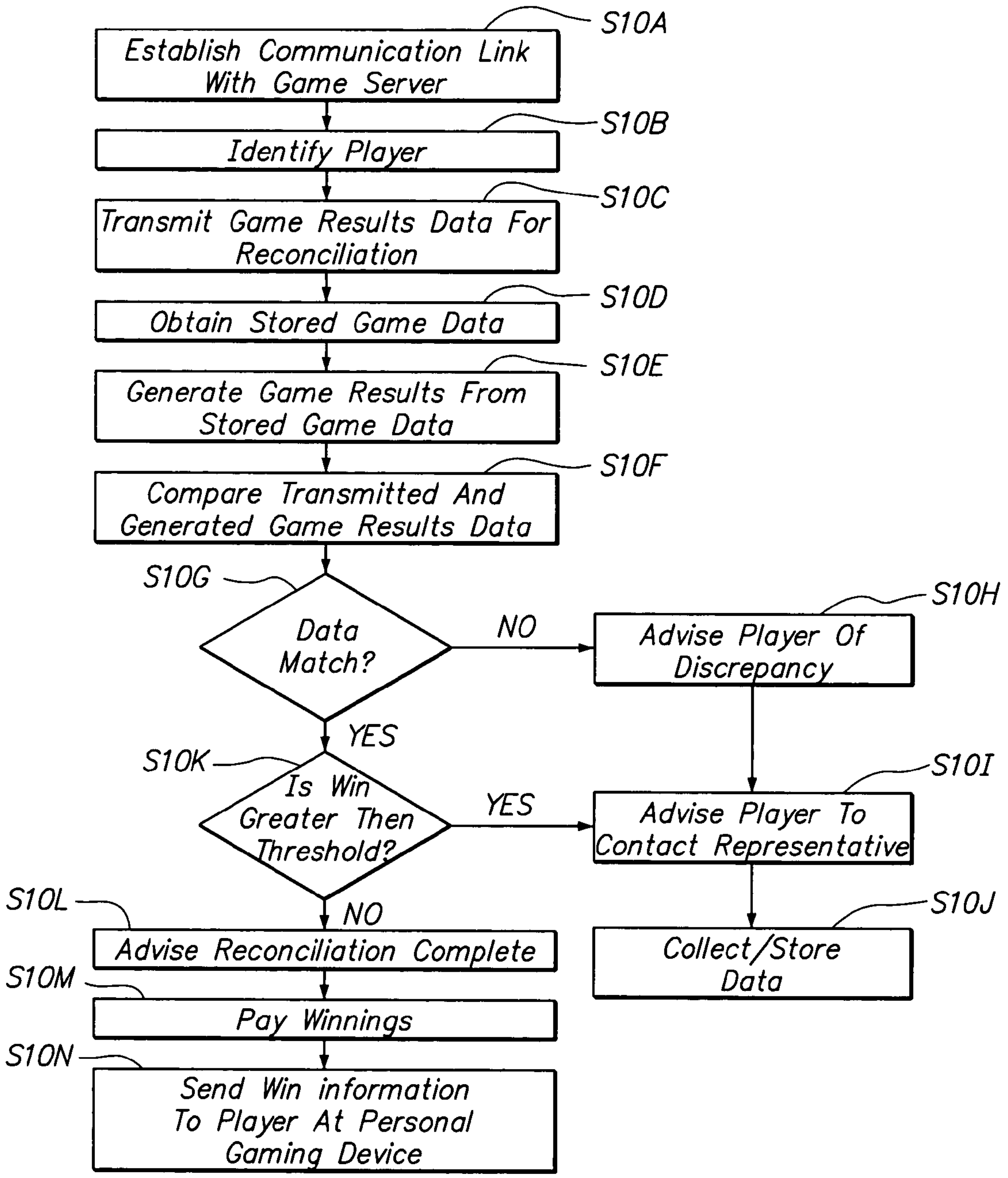
FIG. 7 is a flowchart illustrating a method of verifying game outcomes in accordance with an embodiment of the invention.

In a step S10, the game results are preferably verified. FIG. 7 illustrates one embodiment of such a method.

In a step S10A, the personal gaming device 20 establishes a communication link with the game server 70. In a step S10B, authentication occurs. Preferably, this authentication comprises either a player providing a PIN or other identifier, such as a biometric (like a fingerprint as described above).

If authentication is completed, then in a step S10C, the game server 70 preferably establishes a communication link with the financial server 68. The game server 70 transmits the game results data provided by the personal gaming device 20. This information may vary, but may comprise information identifying the particular personal gaming device 20 or "game set," as well as the results of those games, such as a monetary balance representing win and loss information for each game and/or total win or loss information.

In a step S10D, the financial server 68 retrieves the previously provided session data provided by the game server 70 when the game information was originally generated (see step S1H in FIG. 5).

In a step S10E, in one embodiment, the financial server 68 generates the results associated with the game data. This may comprise the financial server 68 determining the monetary win or loss associated with each game outcome, as well as the total win or loss for all games.

In a step S10F, the financial server compares the outcome data provided by the personal gaming device 20 to the outcome data which is based upon the game server 70 generated game data.

In a step S10G, if the data is not the same, then in a step S10H the player is preferably advised of the discrepancy in the reconciliation. The player is then advised in a step S10I to seek assistance, such as by contacting a casino representative for further investigation of the issue. In a step S10J, the financial server 68 preferably stores the data used to perform the reconciliation for use by the representative in investigating the issue.

If the data reconciles instep S10G, then in a step S10K it is preferably determined if the win for a particular game, or the total winnings for a group of games, exceeds a predetermined threshold. If so, the game results are preferably verified a second time. This step may also include additional audit procedures, such as confirming game wins. If this additional reconciliation is not successful, the player may be advised to contact a representative, as in step S10I.

If in step S10K the win amount is under the threshold, then in step S10L the player is advised that reconciliation has occurred. In a step 10M, the player is preferably paid any winnings. Where the player has a game financial account, this may comprise the financial server 68 simply updating the player's account information. The player may also be paid winnings in other manners, such as by a ticket, by credit to their credit card account or the like.

In a step S10N, the financial server 68 preferably sends the win information to the personal gaming device 20 for viewing by a player. For example, the personal gaming device 20 may be caused to display a message such as "Congratulations, you won 1015 credits. Your account has been credited and you now have 1873 total credits."

Additional aspects of the invention will be described with reference to FIG. 8. As described above, in one embodiment, a player essentially purchases the right to play one or more games, and data or information which defines or comprises the outcome of the games is generated for use in later game play. FIG. 8 illustrates a system by which the user may purchase the games for play. As illustrated, the system 60 may include one or more stations 80. The station 80 may comprise a dedicated station, such as kiosk, or may comprise a home computer. As illustrated, the station 80 has the form of a desk-top computer having a processor 82, a monitor 84 and a keyboard 86. The station 80 may have a variety of other forms. The station 80 is preferably linked at one or more times with the game server 70, such as via the Internet or a dedication communication link.

In one embodiment, the user may utilize the station 80 to purchase games for play. In one embodiment, the station 80 is configured to display menu or other information to the user in purchasing games or engaging in other activities, such as managing their account.

In one embodiment, when the player has successfully purchased games for play, the game server 70 may be configured to transmit game result information to the kiosk 70. The game result information may then be directed to a smart card interface 90, where the data may be written to a smart card 92 of the player. Once the data is stored on the card 92, the player may remove it and then input it into a gaming device, such as a personal gaming device 20 as described above. Once input into a gaming device, the information may be read from the card 92 for use in presenting one or more games.

In another embodiment, the station 80 may include a docking station 88. The personal gaming device 20 may be configured to interface with the docking station 88, permitting information to be transmitted between the station 88 and the personal gaming device 20. In one embodiment, the game result information may be provided to the personal gaming device 80 via the docking station 88. In this embodiment, the user may obtain the personal gaming device 80 and then associate it with a docking station 88, or the personal gaming device 80 may already be associated with the docking station 88 and essentially "checked-out" from that location.

It will be appreciated that in these embodiments, the exact sequence of steps for implementing a game may differ from those recited in FIGS. 4-7.

In accordance with the invention, a player may be permitted to access a wide variety of goods or services using the personal gaming device 20 other than those particularly described above. For example, a player may be permitted to access a room charges account to view the current room charges associated with their stay at a hotel. A player may be permitted to request their car from a valet service, such as by entering a valet stub identification number. A player may be permitted to obtain a wide variety of other goods, services or information, or engage in a wide variety of other activities.

The personal gaming device 20 of the present invention has numerous advantages. First, a player is permitted to use a personal gaming device 20 to participate in a game at other than a fixed location. The player may play a game at a location which is removed from the location of traditional fixed gaming devices. These locations may include the player's hotel room, a restaurant, a bar or lounge, a sports book, a hotel/casino pool area, and a wide variety of other areas remote from the fixed gaming devices. Of course, the player may also utilize the personal gaming device to participate in a game in the area of stationary gaming machines, and may even participate in games played on both the personal gaming device and a stationary machine at the same time.

Another advantage of the personal gaming device is that the device is easily transportable. The player may take the device with them as they travel from location to location, such as from a restaurant to the player's room. Thus, while the player is engaging in other activities, such as eating or moving from one location to another in a casino, the player's ability to play a game is not interrupted.

Another advantage of the personal gaming device is that its configuration results in ease of use. The personal gaming device is preferably hand-held, and wireless and can thus easily be transported by a player. In addition, the personal gaming device 20 is simplistic in design to make its use easily understandable by even inexperienced players. In general, necessary acts by a player may be prompted, such as with instructions displayed on the display or provided audibly through the speaker 36.

The personal gaming device 20 is also versatile, and is not limited to presenting only a game for play by a player. As noted, a player or user of the personal gaming device 20 may utilize the personal gaming device to access a wide variety of information and obtain a wide variety of services. The player may access the Internet, obtaining information therefrom (such as news and weather) and may obtain goods and services there through (such as by placing orders with vendors having websites). The player may make room, show or restaurant reservations and obtain hotel/casino information.

One aspect of the invention is a method of presenting games via one or more portable devices in which the devices have resident game code for presenting a game, but which without additional game data will not allow the game to be played. Preferably, the additional game data comprise game result data, such as RNG and/or paytable information. This configuration has the advantage that substantially all of the game code can be stored on the portable device, thus reducing the download times associated with configuration the device for game play. At the same time, however, the portable device will not present games without first receiving the additional data.

A related advantage of the game is the ability of the player to pay for a block of games at a single time. Instead of being force to confirm payment for each game to be played when it is played, such as by credit card authorization, the player pays for the "game results" for a block of games all at the same time.

As one aspect of the invention, the game results may be provided on a game card, such as a smart card. The player may then keep the game results and use them to play games on portable devices at various times and in various locations. For example, the player may purchase 100 games and the associated "results" may be stored on a player card. The result information may be read by a portable device for use in presenting games to a player. The player may then elect to play additional of the games at a later time, even using a different device. At that later time, the result information may again be read and used to present additional games.

Another advantage of the invention is a configuration which ensures the portable device is being used in the proper location, and is not being stolen or tampered with. As described this comprises a system in which activation information is transmitted to the portable device, and where if the information is not received or confirmed, the portable device will not present games for play. This prevents, for example, a use from taking the portable device or attempting to use it in unauthorized locations.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A portable gaming device in a gaming network, comprising:

a first processor;

memory;

a first display;

at least one interface for communicating with at least one other device in the gaming network;

the gaming device being operable to:

control a wager-based game played at the gaming device;

receive input from a first user for initiating a first wager-based gaming session at the gaming device;

initiate the first gaming session at the gaming device;

receive, after initiation of the first gaming session, first wager information relating to a first wager to be placed by the first user in connection with game play conducted at the gaming device during the first gaming session, wherein the first wager information includes a wager amount;

initiate, during the first gaming session, play of a first wager-based game at the gaming device;

verify, during the first gaming session, periodic receipt of activation information from a first remote gaming server; and prevent game play at the gaming device in response to a determination that no periodic activation information has been received at the gaming device during a first time interval;

receive gaming information generated by the first remote gaming server, wherein the gaming information relates to play of the wager-based game at the portable gaming device, wherein the gaming information includes data representing an outcome of the first wager-base game;

store the gaming information at the portable gaming device;

execute game code at the portable gaming device, the game code using at least a portion of the gaming information to present at least a portion of the wager-based game at the portable gaming device; and present the game outcome for the wager-based game played at the gaming device during the first gaming session.

2. The gaming device of claim 1 further comprising:

an input mechanism for receiving cash or an indicia of credit.

3. The gaming device of claim 1 being further operable to:

update credit information relating to game play activities and wagering activities conducted at the gaming device during the first gaming session.

4. The gaming device of claim 1 being further operable to:

receive first wager payment information relating to a payment of the first wager amount; and accept placement of the first wager in response to receiving the first wager payment information.

5. The gaming device of claim 1 being further operable to:

receiving, after initiating play of the first wager-based game at the gaming device, second wager information relating to a second wager to be placed by the first user in connection with game play conducted at the gaming device during the first gaming session, wherein the second wager information includes a second wager amount.

6. The gaming device of claim 5 being further operable to:

receive second wager payment information relating to a payment of the second wager amount; and accept placement of the second wager in response to receiving the second wager payment information.

7. The gaming device of claim 1 further comprising:

a magnetic card reader;

the gaming device being further operable to:

read, using the magnetic card reader, financial account information from a card presented to the magnetic card reader;

receive first wager payment information relating to payment of a first wager amount; and accept placement of the first wager in response to receiving the first wager payment information.

8. The gaming device of claim 1 further comprising:

a magnetic card reader;

the gaming device being further operable to:

enable the first user to use a credit card for providing payment of the first wager amount via use of the magnetic card reader;

accept, via use of the magnetic card reader, a credit card payment relating to the first wager amount; and accept placement of the first wager in response to confirming payment of the first wager amount.

9. The gaming device of claim 1 further comprising:

an input mechanism for receiving cash or an indicia of credit;

the gaming device being further operable to:

receive, via the input mechanism, financial account information from a credit instrument presented to the input mechanism;

access, using at least a portion of the financial account information, credit information from a remote financial server, said credit information including available credit information relating to a financial account associated with the first user; and verify, using at least a portion of the credit information, an availability of credit a the financial account sufficient to cover payment of the first wager amount.

10. The gaming device of claim 1 being further operable to:

receive, after initiation of the first gaming session at the gaming device, first game outcome information from the remote game server, the first game outcome information relating to an outcome of a first wager-based game played at the gaming device.

11. The gaming device of claim 1 being further operable to:

present, via the first display and during the first gaming session, a menu of different wager-based games playable by the first user at the gaming device;

receive, during the first gaming session, game selection input from the first user relating to a selection of a first wager-based game for play at the gaming device; and initiate, during the first gaming session and in response to the game selection input, play of the first wager-based game at the gaming device.

12. The gaming device of claim 1 being further operable to:

store, at the memory of the gaming device, game history information relating to one or more wager-based games played at the gaming device.

13. The gaming device of claim 1 being further operable to:

detect an end of a first game play session at the gaming device;

identify game history information relating to the first game play session, the game history information including game outcome information relating to the first game play session;

detect for presence of a first communication link to a remote accounting server;

upload the game history information to the remote accounting server if it is detected that the first communication link is present; and store the game history information in the memory of the gaming device at it is detected that the first communication link is not present.

14. The gaming device of claim 1 being further operable to:

determine an identity of the first player using biometric information input via at least one biometric input device located at the gaming device.

15. The gaming device of claim 1 being further operable to:

initiate at least one first action relating to an account reconciliation in response to receiving input from the first user relating to a request to implement an account reconciliation operation;

initiate at least one first action relating to a wager-based game purchase in response to receiving input from the first user relating to a request to purchase the wager-based game;

initiate at least one first action relating to a review of selected account information in response to receiving input from the first user relating to a request to review the selected account information;

initiate at least one first action relating to an inquiry regarding an account in response to receiving input from the first user relating to a request to initiate an account inquiry regarding the account;

initiate at least one first action relating to a cash withdrawal in response to receiving input from the first user relating to a request to perform the cash withdrawal; and initiate at least one first action relating to a cash deposit cash in response to receiving input from the first user relating to a request to perform the cash deposit.

16. The gaming device of claim 1 being further operable to:

determine an identity of the first user; and verify whether the first user is authorized to engage in play of a first wager-based game at the gaming device.

17. The gaming device of claim 1 being further operable to:

verify whether the first user is of legal age to engage in play of a first wager-based game at the gaming device.

18. The gaming device of claim 1 further comprising:

an image capturing device;

the gaming device being further operable to:

capture a first image of the first user; and authenticate an identity of the first player using the first captured image.

19. The gaming device of claim 1 being further operable to:

store, in the memory, a first portion of base game code relating to a first wager-based game, the first portion of base game code being insufficient, when executed at the gaming device, to enable the gaming device to present the first wager-based game for play at the gaming device.

20. The gaming device of claim 1 being further operable to:

store, in the memory, a first portion of base game code relating for a first wager-based game, the first portion of base game code being insufficient, when executed at the gaming device, to enable the gaming device to present the first wager-based game for play at the gaming device;

receive additional gaming information including game code or data relating to the first wager-based game from the first remote gaming server; and present, using the first portion of base game code and the game code or data received with the additional gaming information, the first wager-based game for play at the gaming device.

21. The gaming device of claim 1 being further operable to:

store, in the memory, a first portion of base game code relating to a first wager-based game, the first portion of game code being insufficient, when executed at the gaming device, to enable the gaming device to present the first wager-based game for play at the gaming device;

receive additional gaming information including game data relating to the first wager-based game from the first remote gaming server, wherein the additional game data includes paytable information; and present, using the first portion of the base game code and the game data received with the additional gaming information, the first wager-based game for play at the gaming device.

22. The gaming device of claim 1 being further operable to:

access remote information from one or more remote devices;

display at least a portion of the accessed information at the first display;

wherein the remote information is selected from a group consisting of: information relating to hotel room availability, information relating to a hotel rates, information relating to entertainment shows, and information relating to restaurants.

23. The gaming device of claim 1 being further operable to:

enable the first player to make a show reservation using the gaming device;

enable the first player to make a ticket reservation using the gaming device;

enable the first player to make a hotel reservation using the gaming device; and enable the first player to make a restaurant reservation using the gaming device.

24. The gaming device of claim 1 being further operable to:

enable the first player to access and view, using the gaming device, room charge information relating to one or more room charges associated with the user's stay at a hotel.

25. The gaming device of claim 1 being further operable to:

enable the first player to request, using the gaming device, a car from a valet service.

26. The gaming device of claim 1 further comprising:

a ticket printer;

the gaming device being further operable to:

generate, using the ticket printer, a credit instrument having information printed thereon relating to a value or amount of wager-related assets won by the first player during the first gaming session.

27. The gaming device of claim 1 being further operable to:

detect an occurrence a first security-related event or condition relating to the gaming device; and generate a loud audible signal in response to detecting the first security-related event or condition.

28. The gaming device of claim 1 being further operable to:

detect an occurrence a first security-related event or condition relating to the gaming device; and display a warning message to the first player in response to detecting the first security-related event or condition.

29. The gaming device of claim 1 being further operable to:

detect an occurrence a first security-related event or condition relating to the gaming device; and erase at least a portion of the memory at the gaming device in response to detecting the first security-related event or condition.

30. The gaming device of claim 1 being further operable to:

detect an occurrence a first security-related event or condition relating to the gaming device; and disable operation of the gaming device in response to detecting the first security-related event or condition.

31. A method of operating a portable gaming device in a gaming network, the portable gaming device including a first processor, memory, a first display, and at least one interface for communicating with at least one other gaming device in the gaming network, the method comprising:

controlling a wager-based game played at the gaming device;

receiving input from a first user for initiating a first wager-based gaming session at the gaming device;

initiating the first gaming session at the gaming device;

receiving, after initiation of the first gaming session, first wager information relating to a first wager to be placed by the first user in connection with game play conducted at the gaming device during the first gaming session, wherein the first wager information includes a first wager amount;

initiating, during the first gaming session, play of a first wager-based game at the gaming device verifying during the first gaming session, periodic receipt of activation information from a first remote gaming server; and preventing game play at the gaming device in response to a determination that no periodic activation information has been received at the gaming device during a first time interval;

receiving gaming information generated by the first remote gaming server, wherein the gaming information relates to play of the first wager-based game at the portable gaming device, wherein the gaming information includes data representing an outcome of the first wager-based game;

storing the gaming information at the portable gaming device;

executing game code at the portable gaming device, the game code using at least a portion of the gaming information to present at least a portion of the wager-based game at the portable gaming device; and presenting a game outcome for the first wager-based game played at the gaming device during the first gaming session.

32. The method of claim 31 further comprising:

updating credit information stored at the gaming device relating to game play activities and wagering activities conducted at the gaming device during the first gaming session.

33. The method of claim 31, the gaming device further comprising:

receiving first wager payment information relating to a payment of the first wager amount; and accepting placement of the first wager in response to receiving the first wager payment information.

34. The method of claim 31 further comprising:

receiving, after initiating play of the first wager-based game at the gaming device, second wager information relating to a second wager to be placed by the first user in connection with game play conducted at the gaming device during the first gaming session, wherein the second wager information includes a second wager amount.

35. The method of claim 34, the gaming device further comprising:

receiving second wager payment information relating to a payment of the second wager amount; and accepting placement of the second wager in response to receiving the second wager payment information.

36. A portable gaming device in a gaming network, comprising:

a first processor;

memory;

a first display;

at least one interface for communicating with at least one other device in the gaming network;

an input mechanism for receiving cash or an indicia of credit;

controlling a wager-based game played at the gaming device;

means for receiving input from a first user for initiating a first wager-based gaming session at the gaming device;

means for initiating the first gaming session at the gaming device;

means for receiving, after initiation of the first gaming session, first wager information relating to a first wager to be placed by the first user in connection with game play conducted at the gaming device during the first gaming session, wherein the first wager information includes a first wager amount;

means for initiating, during the first gaming session, play of a first wager-based game at the gaming device;

means for verifying, during the first gaming session, periodic receipt of activation information from a first remote gaming server; and means for preventing game play at the gaming device in response to a determination that no periodic activation information has been received at the gaming device during a first time interval;

means for receiving, after initiating play of the first wager-based game at the gaming device, second wager information relating to a second wager to be placed by the first user in connection with game play conducted at the gaming device during the first gaming session, wherein the second wager information includes a second wager amount;

means for receiving gaming information generated by the first remote gaming server, wherein the gaming information relates to play of the wager-based game at the portable gaming device, wherein the gaming information includes data representing an outcome of the first wager-based game;

means for storing the gaming information at the portable gaming device;

means for executing game code at the portable gaming device, the game code using at least a portion of the gaming information to present at least a portion of the wager-based game at the portable gaming device; and means for presenting a game outcome for the wager-based game played at the gaming device during the first gaming session.

* * * * *